(12) United States Patent
Hirsch et al.

(10) Patent No.: US 12,448,141 B2
(45) Date of Patent: Oct. 21, 2025

(54) SYSTEMS AND METHODS FOR AIRCRAFT THRUST RATING MODEL PROCESSING

(71) Applicant: THE BOEING COMPANY, Arlington, VA (US)

(72) Inventors: Theresa J. Hirsch, Laguna Niguel, CA (US); Geun I. Kim, Bothell, WA (US); John William Alaimo, Jr., Lynwood, WA (US); Mark Aaron Ulrich, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 154 days.

(21) Appl. No.: 18/317,497

(22) Filed: May 15, 2023

(65) Prior Publication Data

US 2024/0383612 A1   Nov. 21, 2024

(51) Int. Cl.
*B64D 31/00*   (2024.01)
*G05B 17/00*   (2006.01)

(52) U.S. Cl.
CPC ............. *B64D 31/00* (2013.01); *G05B 17/00* (2013.01)

(58) Field of Classification Search
CPC ............................... B64D 31/00; G05B 17/00
See application file for complete search history.

(56) References Cited

U.S. PATENT DOCUMENTS

| | | | | |
|---|---|---|---|---|
| 5,893,040 A | * | 4/1999 | Gunn | G05D 1/0607 73/112.04 |
| 10,486,826 B2 | | 11/2019 | Kim et al. | |
| 2018/0048424 A1 | * | 2/2018 | Meilinger | G06F 13/42 |
| 2022/0106059 A1 | * | 4/2022 | Smith, Jr. | F02C 9/00 |

OTHER PUBLICATIONS

Extended European Search Report for application No. 24163011.0 dated May 2, 2024, pp. 1-7.

* cited by examiner

*Primary Examiner* — Scott A Browne
*Assistant Examiner* — Izcalli Rios-Aguirre
(74) *Attorney, Agent, or Firm* — Moore IP Law

(57) ABSTRACT

An aircraft includes engines, electronic engine controllers (EECs) associated with the engines, and a flight management computer (FMC). The FMC includes a non-volatile memory and processor(s) configured to perform one or more error check operations based on engine data from a non-volatile memory of the FMC to determine whether to select an engine thrust rating for a thrust model of the aircraft based, in part, on an engine rating identifier associated with the engine data. The processor(s) may also, or alternatively, be configured to select, based on the plurality of local thrust rating model (TRM) identifiers, intermix thrust model data for use by the FMC during a flight of the aircraft, where the intermix thrust model data is associated with a thrust model identifier that is common to two or more engines of the aircraft.

20 Claims, 11 Drawing Sheets

SYSTEMS AND METHODS FOR AIRCRAFT THRUST RATING MODEL PROCESSING

FIELD OF THE DISCLOSURE

The present disclosure is generally related to determination of thrust rating model data to be used by an aircraft.

BACKGROUND

The Flight Management Computer (FMC) installed in a modern aircraft performs various functions, such as navigation, guidance, flight planning, datalink, and performance management. For example, a performance management function of the FMC uses airplane and engine models and optimization algorithms to generate a full flight-regime vertical profile consistent with the performance mode selected and within flight plan constraints. Inputs to the performance management function include, for example, fuel flow, total fuel, engine data and limits, altitude, airspeed, Mach number, temperature, vertical velocity, progress along the flight plan, and pilot inputs from the Control Display Unit (CDU). Based on these inputs, and the aircraft and engine models, the performance management function outputs information such as results of thrust limit computation (TLC), target Mach number values, target calibrated airspeed (CAS) values, target thrust values, and advisory data to the crew. The performance management function may also use aerodynamic and propulsion performance data stored in a Performance Data Base (PDB) to compute a predicted flight profile and associated trip prediction parameters, such as economy speed, optimal altitude, estimated time of arrival, and predicted fuel consumption.

To perform the various calculations of the performance management function, the FMC uses a large set of data tables (performance data refinement (PDR) tables). At least some of these data tables replicate data that is also stored at the electronic engine controller (EEC) of each engine of the aircraft. For example, one type of data used by the FMC is the Thrust Rating Model (TRM) data. The TRM data for each engine of the aircraft is conventionally stored at both the FMC and the EEC of the engine. This duplication of data storage is inefficient and introduces the possibility of errors if one set of tables is updated and the other is not.

SUMMARY

In a particular implementation, a method includes accessing, by one or more processors of a flight management computer (FMC) of an aircraft, first engine data from a non-volatile memory of the FMC. The method also includes performing, by the one or more processors, one or more error check operations based on at least the first engine data to determine whether to select an engine thrust rating for a thrust model of the aircraft based, in part, on a first engine rating identifier associated with the first engine data.

In another particular implementation, an aircraft includes two or more engines and two or more electronic engine controllers (EECs). Each EEC is associated with a respective one of the two or more engines. The aircraft also includes an FMC communicatively coupled to the two or more EECs. The FMC includes a non-volatile memory and one or more processors configured to access first engine data from the non-volatile memory. The one or more processors are also configured to perform one or more error check operations based on at least the first engine data to determine whether to select an engine thrust rating for a thrust model of the aircraft based, in part, on a first engine rating identifier associated with the first engine data.

In another particular implementation, a non-transitory, computer-readable medium stores instructions that are executable by one or more processors to cause the one or more processors to access, from a non-volatile memory of an FMC, engine data associated with engines of an aircraft. The instructions further cause the one or more processors to perform one or more error check operations based on at least the engine data. The instructions further cause the one or more processors to select an engine thrust rating for a thrust model of the aircraft. The engine thrust rating is selected from among the engine data accessed from the non-volatile memory or from engine data received from an EEC of the aircraft based at least in part on results of the one or more error check operations.

In another particular implementation, a method includes, between powerup of an FMC of an aircraft and a subsequent takeoff of the aircraft: determining, by one or more processors of the FMC, a plurality of local thrust rating model (TRM) identifiers, including at least one local TRM identifier for each respective one of a plurality of engines of the aircraft. The method also includes selecting, by the one or more processors of the FMC based on the plurality of local TRM identifiers, intermix thrust model data for use by the FMC during a flight of the aircraft. The intermix thrust model data is associated with a thrust model identifier that is common to the plurality of engines.

In another particular implementation, an aircraft includes two or more engines and two or more EECs. Each EEC is associated with a respective one of the two or more engines. The aircraft also includes an FMC communicatively coupled to the two or more EECs. The FMC includes one or more processors configured to, between powerup of the FMC and a subsequent takeoff of the aircraft: determine a plurality of local TRM identifiers, including at least one local TRM identifier for each respective one of the two or more engines. The one or more processors are also configured to select, based on the plurality of local TRM identifiers, intermix thrust model data for use by the FMC during a flight of the aircraft. The intermix thrust model data is associated with a thrust model identifier that is common to the two or more engines.

In another particular implementation, a non-transitory, computer-readable medium stores instructions that are executable by one or more processors to cause the one or more processors to, between powerup of an FMC of an aircraft and a subsequent takeoff of the aircraft, determine a plurality of local TRM identifiers, including at least one local TRM identifier for each respective one of a plurality of engines of the aircraft. The instructions further cause the one or more processors to select, based on the plurality of local TRM identifiers, intermix thrust model data for use by the FMC during a flight of the aircraft. The intermix thrust model data is associated with a thrust model identifier that is common to the plurality of engines.

The features, functions, and advantages described herein can be achieved independently in various implementations or may be combined in yet other implementations, further details of which can be found with reference to the following description and drawings.

DETAILED DESCRIPTION

Figure 1:
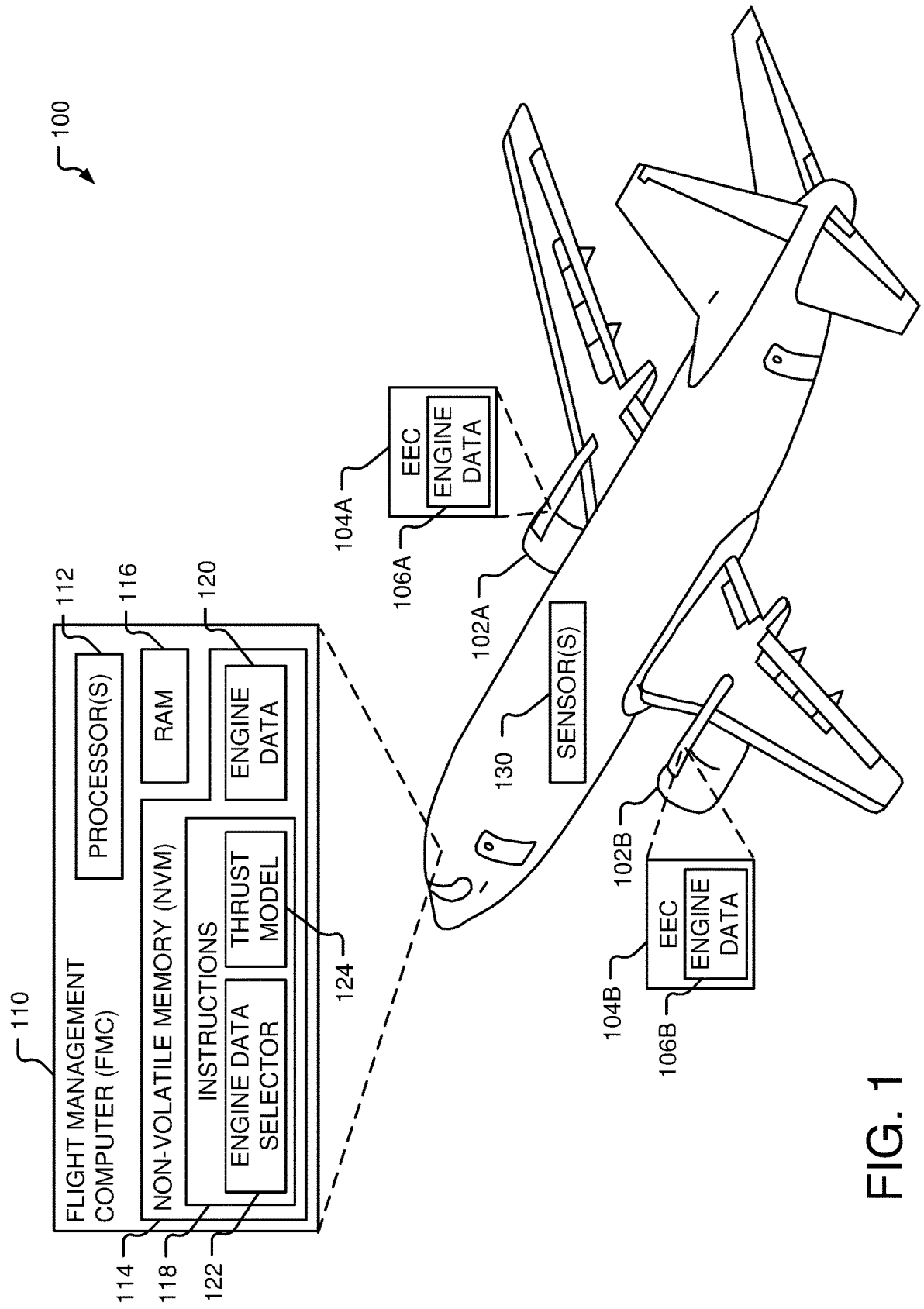
FIG. 1 is a diagram that illustrates an example of an aircraft according to particular implementations of the disclosure.

Systems and methods disclosed herein reduce duplicate data storage by the FMC and EECs of an aircraft. In particular, the FMC stores, in non-volatile memory, engine data related to an engine configuration during a most recent flight. Other TRM tables and engine data are stored at the EEC, but not duplicated at the FMC. One technical benefit of such a configuration is more efficient memory utilization since duplicate data is not stored in multiple locations. Another technical benefit is reduced opportunity for error due to one set of data (e.g., data stored at an EEC) differing from the other set of data (e.g., the data stored at the FMC). For example, as explained in detail below, when new engine data is needed at the FMC, the engine data is accessed from the EEC, thereby avoiding data mismatches.

In the disclosed systems and methods, engine data that are common between the EECs and the TRM of the FMC are uploaded from the EECs to the FMC on demand. The FMC will retain a copy of the engine data from the EECs in the FMC non-volatile memory (NVM). During the initialization, integrity of engine data stored in the NVM of the FMC is checked for internal consistency as well as for consistency with engine data stored at the EECs. For example, cyclic redundancy checks (CRCs) or other error detection operations can be used to determine whether the engine data stored at the NVM should be used, or whether data should be requested from one or more of the EECs. In normal operation, the engine data stored in the NVM of the FMC is expected to pass the data integrity checks, in which case the FMC uses the engine data from the NVM for thrust model calculations during a subsequent flight.

In non-normal operations, the engine data stored in the NVM of the FMC is not expected to pass the data integrity checks. For example, a CRC value calculated based on the engine data stored at the NVM of the FMC may not match an expected CRC value of that engine data, such as due to a bit flip as a result of electromagnetic interference or another failure of the NVM. As another example, a CRC value calculated based on the engine data stored at the NVM of the FMC may not match a CRC value from one of the EECs, indicating that the engine data stored at the NVM does not match the engine data stored at the EEC (e.g., due to an engine change). In such non-normal conditions, the FMC retrieves engine data from one or more of the EECs, stores the retrieved engine data in the NVM, and uses the retrieved engine data for thrust model calculations during a subsequent flight.

Since the FMC retains engine data related to a most recently detected configuration, when new engine data is retrieved from one or more of the EECs, the systems and methods disclosed herein dynamically downselect an engine thrust rating that is compatible with all of the engines of the aircraft. A technical benefit of dynamically downselecting an engine thrust rating that is compatible with all of the engines of the aircraft is a reduced opportunity for errors. For example, in systems in which the FMC duplicates all of the TRM data that is stored in the EECs, downselection is performed manually and saved as a configuration setting. When one or more engines of the aircraft are replaced or significantly overhauled and updated, the configuration setting indicating an engine thrust rating that is compatible with all of the engines should be manually updated. Dynamically performing operations to downselect a compatible engine thrust rating for the engines of the aircraft avoids the possibility of the manual update being omitted or performed incorrectly.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple engines are illustrated and associated with reference numbers 102A and 102B. When referring to a particular one of these engines, such as the engine 102A, the distinguishing letter "A" is used. However, when referring to any arbitrary one of these engines or to these engines as a group, the reference number 102 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a flight management computer 110 including one or more processors ("processor(s)" 112 in FIG. 1), which indicates that in some implementations the flight management computer 110 includes a single processor 112 and in other implementations the flight management computer 110 includes multiple processors 112. For ease of reference herein, such features are generally introduced as "one or more" features, and are subsequently referred to in the singular or optional plural (as typically indicated by "(s)") unless aspects related to multiple of the features are being described.

The terms "comprise." "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second." "third." etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating." "calculating." "using." "selecting." "accessing." and "determining" are interchangeable unless context indicates otherwise. For example, "generating." "calculating." or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates an example of an aircraft 100 according to particular implementations of the disclosure. The aircraft 100 of FIG. 1 includes two or more engines 102, illustrated as a first engine 102A and a second engine 102B. Each of the engines 102 is associated with a respective electronic engine controller (EEC) 104, illustrated in FIG. 1 as a first EEC 104A and a second EEC 104B. Each EEC 104 includes (e.g., stores in a local memory) engine data 106 associated with the engine 102 associated with the EEC 104. For example, the first EEC 104A stores engine data 106A associated with the first engine 102A, and the second EEC 104B stores engine data 106B associated with the second engine 102B. Various types of engine data are referred to herein, including engine data, engine rating identifier, thrust rating identifier, and thrust rating model identifier. As used herein, the "engine data" is used as an overarching term that can include the engine rating identifier, the thrust rating identifier, the thrust rating model identifier, and perhaps other engine data. As used herein, the terms "engine rating identifier" and "thrust rating identifier" are synonymous, and the term "thrust rating model identifier" refers to uniquely defined rating data for an engine independent of a bill of materials (BOM) for the engine.

The aircraft 100 also includes a flight management computer (FMC) 110. In the example illustrated in FIG. 1, the FMC 110 includes one or more processors 112, non-volatile memory (NVM) 114, and random-access memory (RAM) 116. In this context, the RAM 116 includes working memory and similar volatile memory of the FMC 110, such as cache, registers, etc. The NVM includes any type of memory that retains stored information when unpowered, such as flash memory, electrically erasable programmable read-only memory (EEPROM), magnetoresistive memory (MRAM), as well as other types of non-volatile memory. The FMC 110 is able to communicate with each of the EECs 104 via one or more buses or other data connections of the aircraft 100.

In the example, illustrated in FIG. 1, the NVM 114 includes (e.g., stores) engine data 120 and instructions 118 that are executable by the processor(s) 112. As explained in detail with reference to FIGS. 2-8, the engine data 120 stored by the NVM 114 generally corresponds to data used in a most recent flight of the aircraft 100; however, the engine data 120 is updated under certain circumstances to include the engine data 106 from one of the EECs 104. For example, a technician could update the engine data 120 in the NVM 114 if the technician is aware that the engine data 120 is incorrect. To illustrate, after one of the engines 102 is changed, the technician can update the engine data 120. In a particular aspect, as explained further below, the FMC 110 operates at each startup as though the engine data 120 were suspect. Accordingly, the FMC 110 performs various error check operations to verify and validate or replace the engine data 120 at each startup.

In contrast, the engine data 106 stored by the EECs 104 is known to be correct. The EECs 104 determine the engine data based on reading the configuration of a set of plugs in the associated engine 102. For example, the configuration of the set of plugs associated with the first engine 102A indicates a thrust rating identifier of the engine 102A. Likewise, the configuration of the set of plugs associated with the second engine 102B indicates a thrust rating identifier of the engine 102B. If one of the engines 102 is replaced (e.g., as part of routine maintenance of the aircraft 100), the new engine will have a set of plugs which may be configured to indicate a different thrust rating identifier, which the EEC 104 is able to sense and interpret to generate data indicating the thrust rating of the engine. The EECs 104A and 104B continuously, periodically, or occasionally, sense the configuration of the plugs of the engines 102A and 102B, respectively, and interpret the configurations to determine the correct engine data 106 for each engine 102.

In the example illustrated in FIG. 1, the instructions 118 stored at the NVM 114 of the FMC 110 include an engine data selector 122 and a thrust model 124. The thrust model 124 is executable by the processor(s) 112 to perform various performance-related calculations, such as lateral and vertical trajectories, estimated fuel burn at various waypoints, estimated weights at various waypoints, etc. As used herein, the "thrust model" is an aspect of a performance model used by the FMC 110. For example, the thrust model 124 includes, is included within, or corresponds to the performance model. In some implementations, the thrust model 124 is configured to receive input data, such as: fuel flow, total fuel, flap position, engine data and limits, altitude, airspeed, Mach number, air temperature, vertical speed, progress along the flight plan and pilot inputs, and the engine data 120. In some implementations, the thrust model 124 is configured to process the input data to generate output data, such as: target values of Mach number, calibrated airspeed and thrust for optimum control of the airplane, and advisory data to the crew. In other implementations, the thrust model 124 can receive more, less, or different input data and can generate more, less, or different output data.

The engine data selector 122 includes instructions that are executable by the processor(s) 112 to select engine data that will be used by the thrust model 124 from among the engine data 106A, 106B, and 120. In a particular aspect, the engine data selector 122 selects the engine data that will be used by the thrust model 124 dynamically between a powerup of the FMC 110 and a subsequent takeoff of the aircraft 100.

For example, during operation (e.g., during or after powerup of the FMC 110), the engine data selector 122 monitors sensor data from one or more sensors 130 to determine whether an engine data processing condition is satisfied. In general, engine data processing is performed in situations in which it is safe to change the engine data available to the FMC, and the engine data processing condition is specified to limit processing to such situations. For example, the engine data processing condition may be satisfied when the aircraft 100 is on the ground. In this example, while the aircraft 100 is on the ground, the engine data selector 122 can iteratively perform a series of operations until termination conditions are satisfied, where the termination conditions are satisfied, for example, when engine data 120 for the thrust model 124 has been selected. In other examples, the engine data processing condition can be satisfied based on a sensed speed of the aircraft 100, a throttle position of the aircraft 100, or based on another setting, other sensor data, or a pilot input. The series of operations that are iteratively performed are summarized below and described in detail with reference to FIGS. 2-8.

During an initialization process, the engine data selector 122 accesses the engine data 120 from the NVM 114 of the FMC 110. The engine data selector 122 performs one or more error check operations based on the engine data 120 (and possibly other data) to determine whether to select an engine thrust rating for the thrust model 124 based, in part, on an engine rating identifier associated with the engine data 120. As the engines 102 start up, the EECs 104 begin to send data to the engine data selector 122, and the engine data selector 122 includes the data received from the EECs 104 in the initialization process when it is available. For example, during one or more early iterations of the operations of the engine data selector 122, only data stored at the NVM 114 may be available to the engine data selector 122. Later, the engine 102A may be started, and the EEC 104A may begin sending data, such as an engine rating identifier of the engine 102A, error check data (e.g., cyclic redundancy check (CRC) data) associated with the engine data 106A, or a portion thereof, etc. During this period, the engine data selector 122 may perform one or more iterations based on data from the NVM 114 and data transmitted by the EEC 104A. Later still, the engine 102B may be started, and the EEC 104B may begin sending data, such as an engine rating identifier of the engine 102B, error check data (e.g., CRC data) associated with the engine data 106B, or a portion thereof, etc. During this period, the engine data selector 122 may perform one or more iterations based on data from the NVM 114, data transmitted by the EEC 104A, and data transmitted by the EEC 104B. In the example illustrated in FIG. 1, the aircraft 100 includes only two engines 102; however, in other implementations, the aircraft 100 includes more than two engines. In such implementations, these additional engines are also associated with EECs that transmit data when their respective engines are started, and the engine data selector 122 utilizes data from these EECs when it becomes available.

The error check operation(s) performed by the engine data selector 122 may include, for example, calculating a CRC value for the engine data 120 stored in the NVM 114 and comparing the calculated CRC value to a CRC value previously determined and stored in the NVM 114. Comparing the calculated CRC value to the stored CRC value enables the engine data selector 122 to determine whether any change to the engine data 120 has occurred since the engine data 120 was stored in the NVM 114. For example, if the NVM 114 is damaged in a manner that changes one or more bits of the engine data 120, the calculated CRC value should not match the stored CRC value, indicating that the engine data 120 is not trustworthy. In this situation, the engine data selector 122 causes the engine data 120 to be erased, overwritten, or marked invalid, and the engine data 120 is not used during selection of the engine thrust rating used by the thrust model 124.

If the calculated CRC value matches the stored CRC value, additional processing is performed to determine whether the engine data 120 in the NVM 114 matches the engine data 106 of one of the EECs 104. For example, when the EEC 104A transmits a CRC value associated with the engine data 106A, the engine data selector 122 compares the CRC value received from the EEC 104A and a CRC value for the engine 102A stored in the NVM 114. Likewise, when the EEC 104B transmits a CRC value associated with the engine data 106B, the engine data selector 122 compares the CRC value received from the EEC 104B and a CRC value for the engine 102B stored in the NVM 114. If the CRC value received from a particular EEC 104 does not match the CRC value for the corresponding engine 102 stored in the NVM 114, the engine data selector 122 causes at least the portion of the engine data 120 for that engine 102 to be erased, overwritten, or marked invalid, and at least that portion of the engine data 120 is not used during selection of the engine thrust rating used by the thrust model 124.

If the CRC value received from a particular EEC 104 matches the CRC value for the corresponding engine 102 stored in the NVM 114, the engine data selector 122 waits for enough data to be received to begin operations to select an engine thrust rating that is compatible with two or more engines 102. For example, the engine data selector 122 waits until at least two EECs 104 have reported thrust rating identifiers for their respective engines 102 (e.g., until it has received a first thrust rating identifier associated with the engine 102A from the EEC 104A and has received a second thrust rating identifier associated with the engine 102B from the EEC 104B). The engine data selector 122 then proceeds to determine one rating identifier based on the received thrust rating identifiers (e.g., a single rating identifier based on the first thrust rating identifier from the EEC 104A and the second thrust rating identifier from the EEC 104B). If the engine data 120 in the NVM 114 has passed the error check operations, the engine data selector 122 may also consider a first engine rating identifier from the NVM 114 when selecting the single rating identifier.

In a particular aspect, determination of the single rating identifier by the engine data selector 122 includes determining a plurality of local thrust rating model (TRM) identifiers, including at least one local TRM identifier for each respective one of a plurality of engines 102 of the aircraft 100, and selecting, based on the plurality of local TRM identifiers, intermix thrust model data for use by the FMC 110 during a flight of the aircraft 100. In this context, the intermix thrust model data refers to the particular engine data used by the thrust model 124 and that is compatible with all of the engines 102 of the aircraft 100. For example, the intermix thrust model data is associated with a thrust model identifier that is common to the engines 102 of the aircraft 100.

In a particular aspect, determining the plurality of local TRM identifiers includes accessing, from the NVM 114, an FMC engine rating for a particular engine 102 and obtaining, from the EEC 104 associated with the particular engine, an EEC engine rating for the particular engine 102. The engine data selector 122 can determine a local rating identifier for the particular engine based on a selected one of the FMC engine rating for the particular engine or the EEC engine rating for the particular engine. For example, the engine data 120 in the NVM 114 may include an FMC engine rating for each of the engines 102A and 102B of the aircraft 100. Additionally, the engine data 106A of the EEC 104A may include an EEC engine rating for the engine 102A, and the engine data 106B of the EEC 104B may include an EEC engine rating for the engine 102B. In this example, the engine data selector 122 can obtain the EEC engine rating for the engine 102A from the EEC 104A and select, as a local rating identifier for the engine 102A, from among the EEC engine rating for the engine 102A and the FMC engine rating for the engine 102A. Likewise, in this example, the engine data selector 122 can obtain the EEC engine rating for the engine 102B from the EEC 104B and select, as a local rating identifier for the engine 102B, from among the EEC engine rating for the engine 102B and the FMC engine rating for the engine 102B.

In some implementations, the EEC engine rating for the particular engine is selected (rather than the FMC engine rating for the particular engine) as the local rating identifier based on a determination that the EEC engine rating is valid. In such implementations, the FMC engine rating for the particular engine is selected as the local rating identifier based on a determination that the EEC engine rating is not valid and that the FMC engine rating is valid. In some such implementations, based on a determination that the EEC engine rating for a particular engine is valid and the FMC engine rating for the particular engine is not valid, the engine data selector 122 sets a flag (e.g., one or more data bits, a signal, etc.) to indicate detection of changed engine data for the particular engine.

After selecting the local rating identifier for each engine 102, the engine data selector 122 determines a local Thrust Rating Model (TRM) identifier for each engine 102. In this context, a TRM identifier uniquely defines rating data for an engine independently of a bill of materials (BOM) for the engine. In contrast, a rating identifier includes both rating data and information about the BOM of the engine. The local TRM identifier for each engine is determined, for example, based on mapping data that maps rating identifiers (e.g., the local rating identifier for each engine 102) to TRM identifiers.

The engine data selector 122 selects the intermix thrust model data based on the local TRM identifiers. For example, in some implementations, a single local TRM identifier (e.g., a representative local TRM identifier from among the local TRM identifiers for all of the engines 102 of the aircraft 100) is selected as a comparison target. In this example, the other local TRM identifiers are compared to the comparison target to identify a common rating identifier as the single rating identifier. For example, when the first local TRM identifier for the engine 102A is selected as the comparison target, the second local TRM identifier for the engine 102B is compared to the comparison target. The single local TRM identifier (e.g., the representative local TRM identifier) is designated as the common rating identifier based on a determination that each of the plurality of local TRM identifiers matches the representative local TRM identifier.

The engine data selector 122 provides the common rating identifier to the thrust model 124 for use in a subsequent flight of the aircraft. For example, the thrust model 124 performs one or more inflight calculations based on an engine thrust rating indicated by the common rating identifier.

Figure 2:
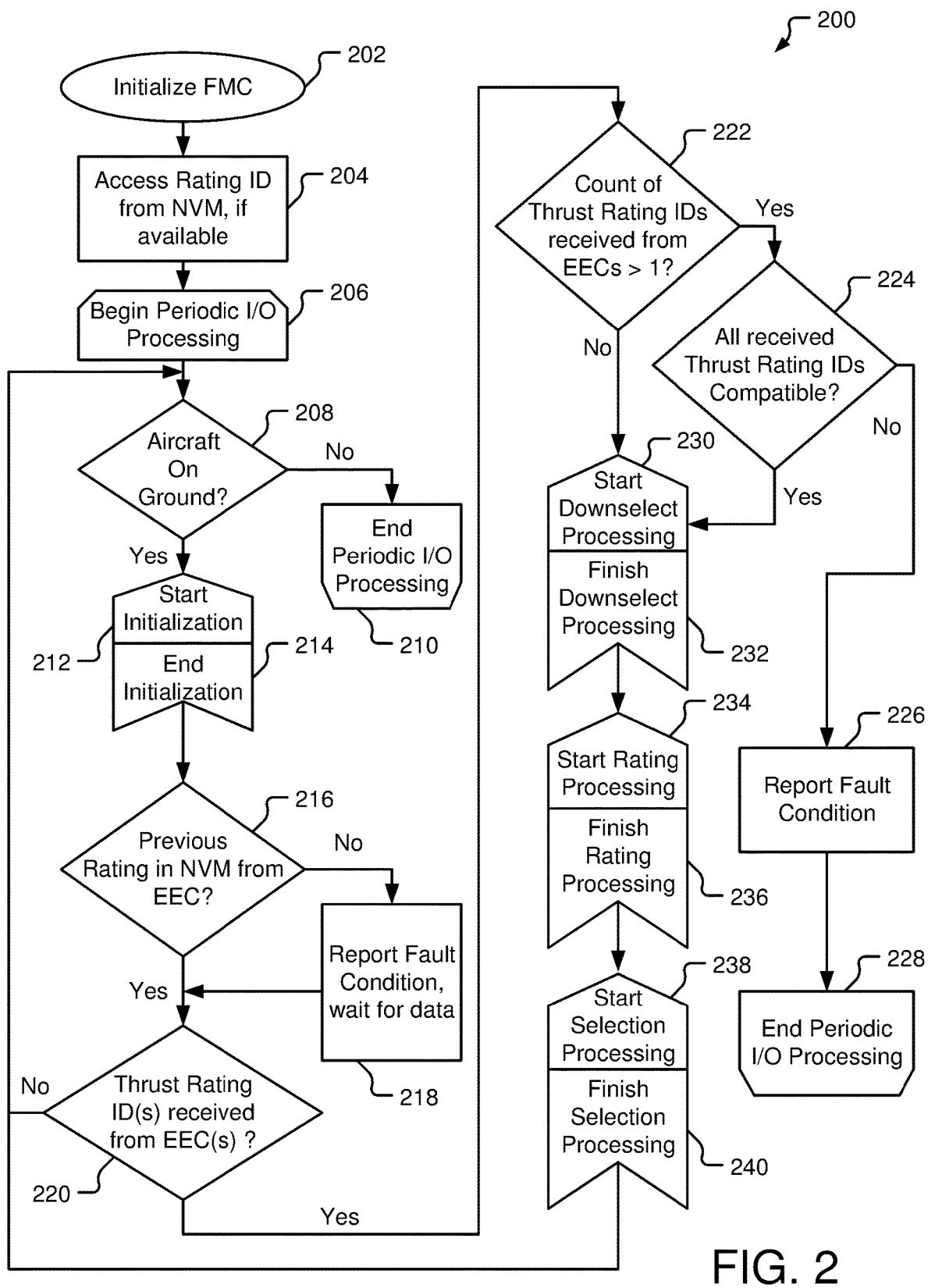
FIG. 2 is a flow chart illustrating an example of a method of dynamically determining thrust model data for an aircraft according to particular implementations of the disclosure.

FIG. 2 illustrates a flow chart illustrating an example of a method 200 of dynamically determining thrust model data for an aircraft according to particular implementations of the disclosure. FIGS. 3-8 illustrate various aspects of the method 200 of FIG. 2. The method 200, including each of the aspects described in FIGS. 3-8, can be performed by one or more processors executing instructions, such as by the processor(s) 112 of the FMC 110 executing the instructions 118 of FIG. 1.

The method 200 begins at block 202 with initialization of the FMC 110. For example, the method 200 may begin with power up or reboot of the FMC 110 in preparation for a flight.

At block 204, the method 200 includes accessing rating identifiers from the NVM 114 of the FMC 110, if any such rating identifiers are available. For example, the rating identifiers can be stored as components of (e.g., data fields of) the engine data 120 in the NVM 114. Any rating identifiers stored at the NVM 114 are generally those retained by the NVM 114 since a prior flight of the aircraft 100.

At block 206, the method 200 begins periodic input/output (I/O) processing. Input processing of the periodic I/O processing includes, for example, receiving data from the EECs 104. Output processing of the periodic I/O processing includes, for example, providing the thrust model 124 with an engine thrust rating to be used to perform inflight calculation(s). In some circumstances, the output processing can also, or alternatively, include providing an alert to crew of the aircraft 100 to indicate an error or fault condition, such as unavailability of data from one or more of the EECs 104, incompatibility of the engines 102 (based on available thrust rating identifiers), failure of particular data to satisfy error checks, etc.

At block 208, the method 200 includes a determination of whether engine data processing can proceed, e.g., whether the aircraft 100 is on the ground or another engine data processing condition is satisfied. The periodic I/O processing continues iteratively until the determination at block 208 is that the engine data processing condition is no longer on satisfied (e.g., the aircraft 100 is no longer on the ground), or until the periodic I/O processing is halted due to a fault condition. Thus, if the determination at block 208 is that the engine data processing cannot proceed, the periodic I/O processing ends at block 210.

Figure 3:
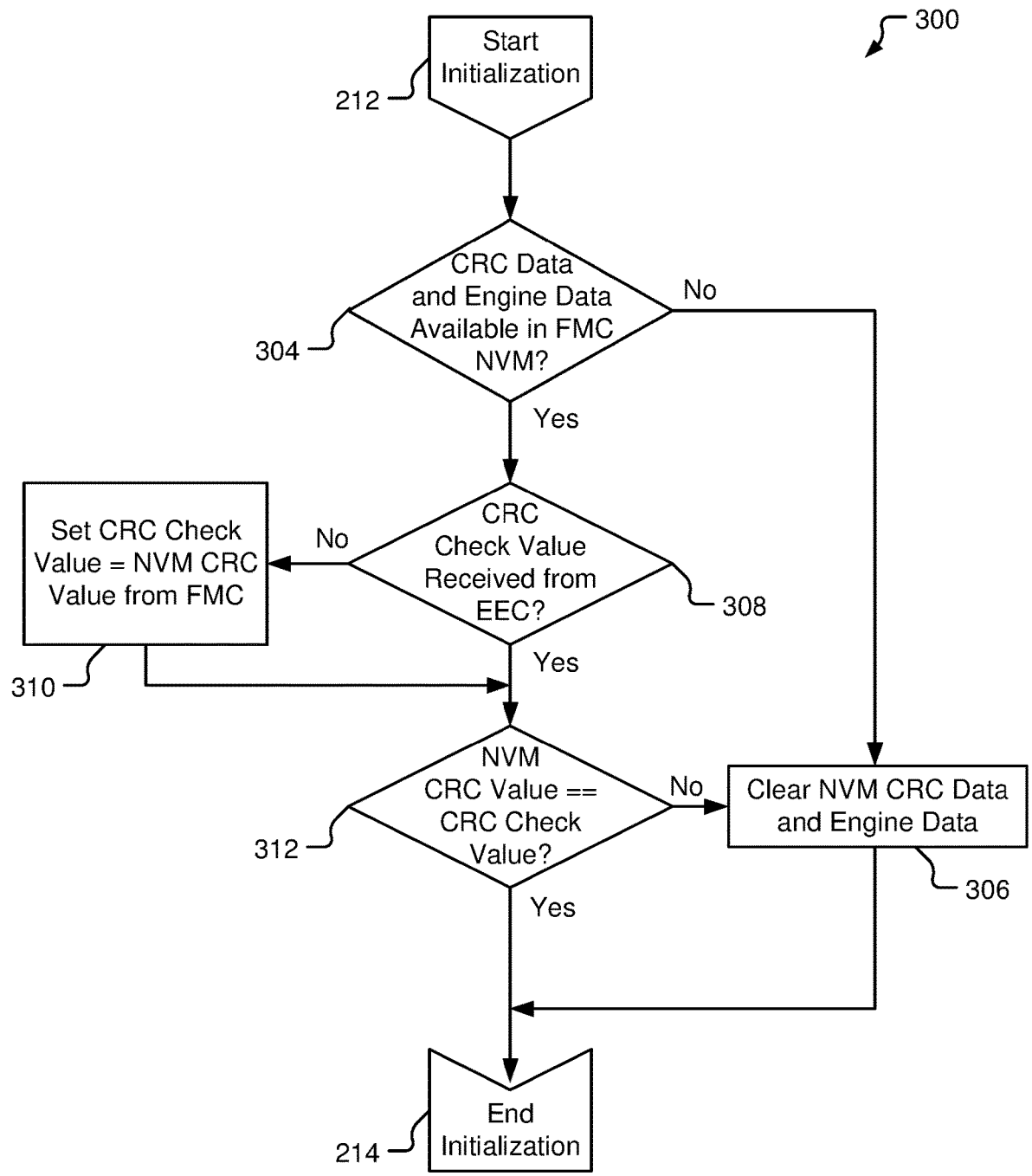
FIG. 3 is a flow chart illustrating an example of a method of initialization that may be performed as an aspect of the method of FIG. 2.

If the determination at block 208 is that the engine data processing can proceed, the method 200 starts an initialization process at block 212. The initialization process includes performing error checks on engine data 120 from the NVM 114. If any data has been received from the EECs 104, the initialization process also includes performing error checks on data from the EECs 104. FIG. 3 illustrates one particular example of operations that can be performed as part of the initialization process.

Referring to FIG. 3, a method 300 of performing the initialization process of FIG. 2, according to a particular implementation, includes, at block 304, a determination of whether the engine data 120 and associated CRC data are available in the NVM 114 of the FMC 110. The CRC data used in the determination associated with block 304 is a CRC value previously calculated based on the engine data 120 and stored at the NVM 114. If the engine data 120 and associated CRC data are not available, the method 300 continues to block 306 where the engine data and CRC data in the NVM 114 (referred to hereinafter as "NVM CRC data" and "NVM Engine data" to distinguish from similar values received from the EECs 104 in later operations) are cleared. Clearing the NVM CRC data and the NVM Engine data can include, for example, overwriting portions of the NVM 114 allocated to storing those data, marking portions of the NVM 114 allocated to storing those data as invalid or available, or other memory management operations that result in any NVM CRC data and the NVM Engine data (e.g., partial data or potentially corrupted data) as unavailable for subsequent processing steps.

If the NVM Engine data and the NVM CRC data are not available, the method 300 continues to block 308 where a determination is made whether any of the EECs 104 has sent a CRC check value. If an EEC 104 has provided a CRC check value for a particular engine 102, the method 300 includes, at block 312, determining whether the CRC check value for the particular engine 102 is equal to an NVM CRC value of the NVM CRC data for the particular engine 102. If the CRC check value for the particular engine 102 is not equal to the NVM CRC value for the particular engine 102, the method 300 continues to block 306 where particular data of the NVM 114 (e.g., the NVM Engine Data and NVM CRC Data) are cleared.

Returning to block 308, if the EEC 104 for a particular engine 102 has not provided a CRC check value for the engine 102, the method 300 includes setting the CRC check value for the particular engine 102 equal to the NVM CRC value of the NVM data for the particular engine 102. The method 300 subsequently continues to block 312 to determine whether the CRC check value for the particular engine 102 is equal to an NVM CRC value for the particular engine 102. The operation performed at block 310 ensures that the CRC check value for the particular engine 102 is equal to an NVM CRC value for the particular engine 102 so that when no CRC check value has been received from a particular EEC, the method 300 does not default to clearing the NVM CRC data and Engine data at block 306. Rather, in this circumstance, the initialization process ends, at block 214, and may be repeated in a subsequent iteration.

Returning to FIG. 2, after the initialization process ends at block 214, the method 200 includes, at block 216, a determination of whether a rating (or ratings) stored in the NVM 114 as part of the engine data 120 is from one of the EECs 104. If the determination at block 216 is that the rating(s) stored in the NVM 114 were not received from the EECs 104, the method 200 includes, at block 218, reporting a fault condition and awaiting data from the EECs 104. In typical operation, the engine data 120 stored in the NVM 114 include data received from the EECs 104; however, in some situations, the engine data 120 may be updated in other ways, such as manually as part of an engine maintenance operation.

The method 200 continues, at block 220, to determine whether at least one thrust rating identifier (Thrust Rating ID) has been received from the EECs 104. Remaining operations of the method 200 rely on receipt of Thrust Rating IDs from the EECs 104. Accordingly, if no Thrust Rating IDs have been received from the EECs 104, the method 200 returns to block 208.

If at least one Thrust Rating ID has been received from the EECs 104, the method 200 includes, at block 222, determining whether the count of Thrust Rating IDs received from the EECs 104 is greater than one. If more than one Thrust Rating ID has been received from the EECs 104, the method 200 includes, at block 224, determining whether the Thrust Rating IDs that have been received are compatible with one another (e.g., based on a compatibility matrix stored at the FMC 110). If it is determined, at block 224, that two or more of the Thrust Rating IDs are not compatible with one another, the method 200 includes, at block 226 reporting a fault condition, and at block 228, ending the periodic I/O processing.

Figure 4:
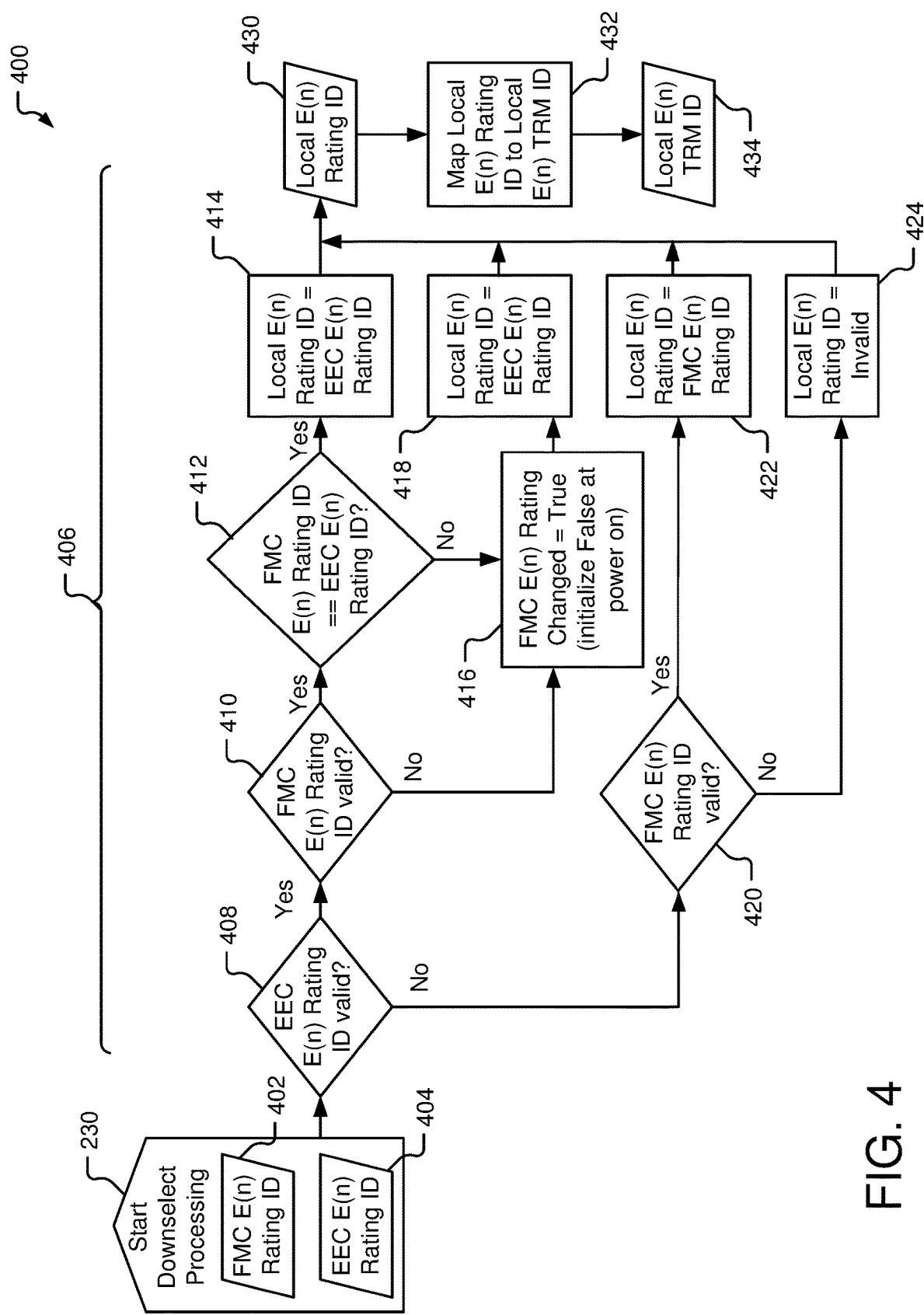
FIGS. 4, 5, and 6 are flow charts illustrating an example of a method of downselection processing that may be performed as an aspect of the method of FIG. 2.
Figure 5:
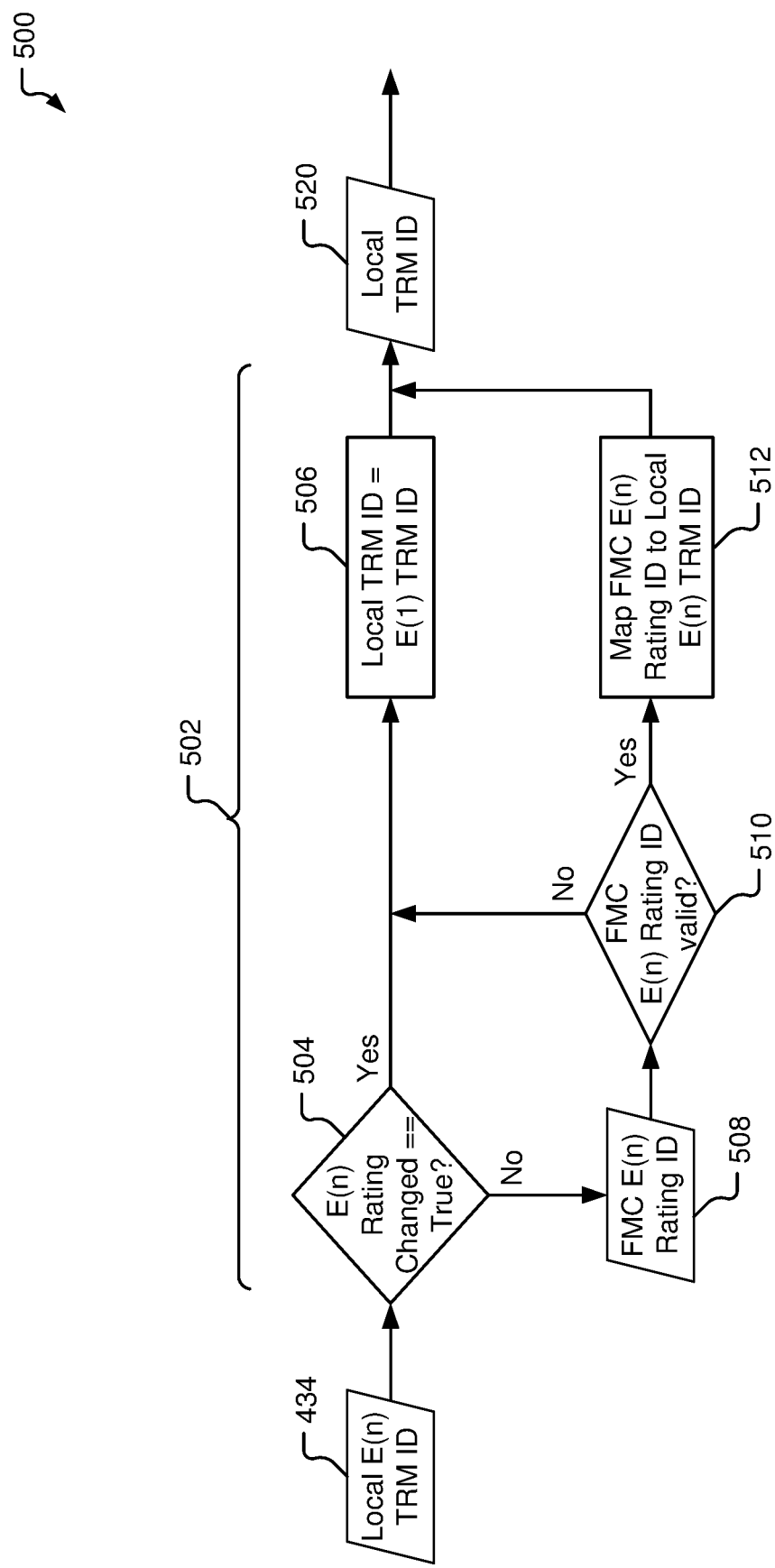
Figure 6:
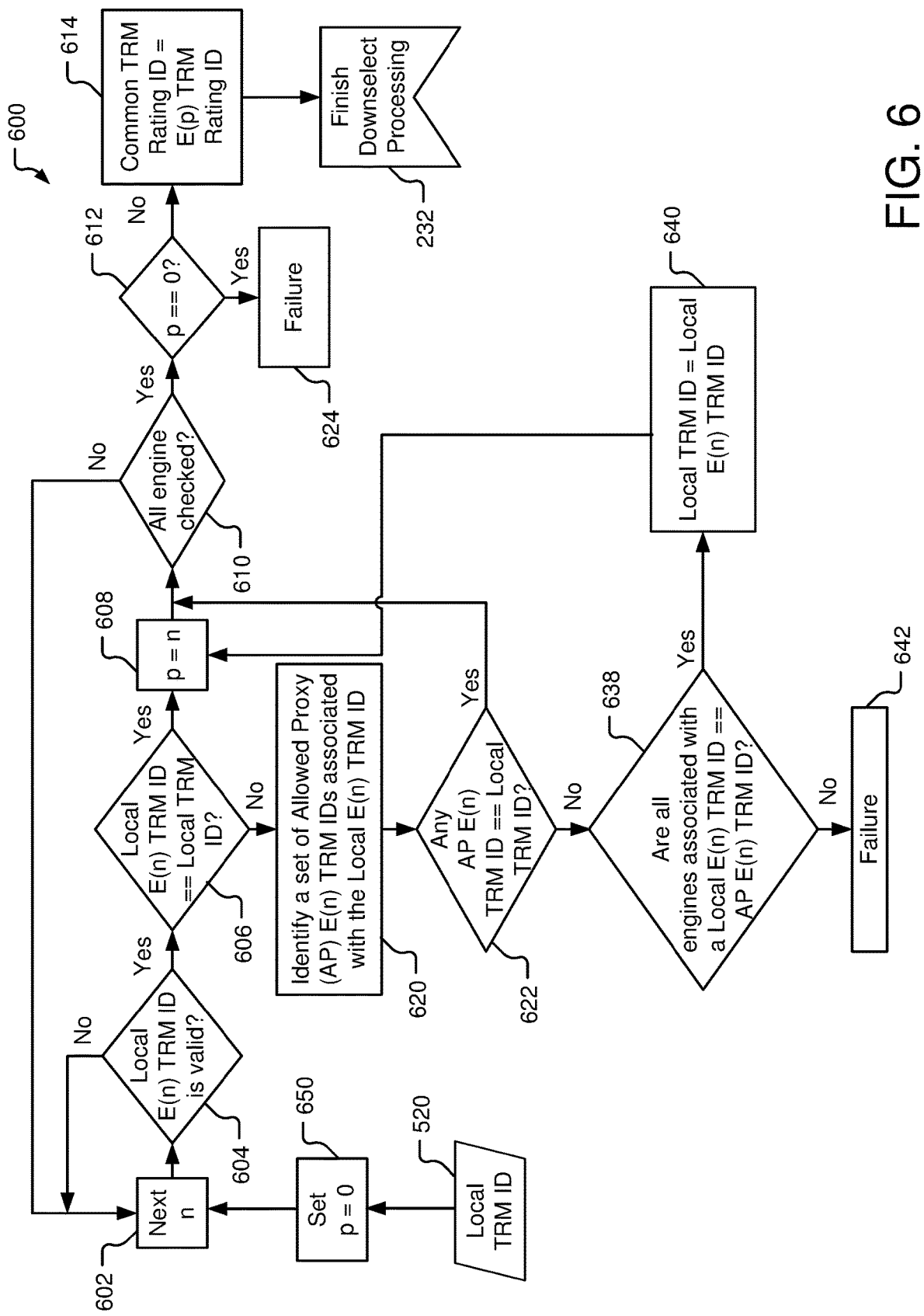

If it is determined, at block 224, that the Thrust Rating IDs that have been received are compatible with one another, or if it is determined, at block 222, that only one Thrust Rating ID has been received, the method 200 includes, at block 230, starting downselect processing. The downselect processing includes operations to select intermix thrust model data (e.g., a set of thrust model data that is compatible with all of the engines 102 of the aircraft 100). Since each engine 102 can be operated at various levels, the intermix thrust model data can be thought of as a greatest common factor among the levels at which the engines can operate (e.g., the highest performance that all of the engines have in common). FIGS. 4-6 illustrates example of operations that can be performed as part of the downselect processing.

FIG. 4 illustrates a method 400 of determining local Thrust Rating Model (TRM) identifiers (IDs) for a set of engines. In FIG. 4, the method 400 is based on FMC E(n) Rating IDs 402 and EEC E(n) Rating IDs 404. The FMC E(n) Rating IDs 402 include engine rating identifiers from the NVM 114 of the FMC 110. The EEC E(n) Rating IDs 404 include engine ratings identifiers received from the EECs 104. Each engine rating identifier of the FMC E(n) Rating IDs 402 is for a respective one of the engines 102 of the aircraft 100, as denoted by the index n. Likewise, each engine rating identifier of the EEC E(n) Rating IDs 404 is for a respective one of the engines 102 of the aircraft 100, as denoted by the index n. Each index n is an integer value assigned to uniquely identify one engine 102 from among a set of engines 102 of the aircraft. For example, the engine 102A may be assigned index value n=1, and the engine 102B may be assigned the index value n=2. In this example, FMC E(1) Rating ID 402 refers to an engine rating identifier stored in the NVM 114 for the engine 102A, and the EEC E(1) Rating ID 404 refers to engine rating identifier for the same engine (i.e., engine 102A) received from the EEC 104A. Likewise, FMC E(2) Rating ID 402 refers to an engine rating identifier stored in the NVM 114 for the engine 102B, and the EEC E(2) Rating ID 404 refers to engine rating identifier for the same engine (i.e., engine 102B) received from the EEC 104B. For aircraft 100 that include more than two engines 102, index values n greater than 2 are assigned to other engines 102.

The method 400 includes a set of operations 406 to select a local engine rating identifier (Local E(n) Rating ID) 430 for each engine 102. In the example illustrated in FIG. 4, operations 406 to select the Local E(n) Rating IDs 430 include determining, for each engine, whether the EEC E(n) Rating ID 404 and the FMC E(n) Rating ID 402 are valid. In the example illustrated in FIG. 4, these determinations are shown as performed sequentially in a particular order; however, it should be understood that these determinations may be performed in parallel, or a different order than is shown in FIG. 4. In the specific example illustrated in FIG. 4, the method 400 includes, at block 408, determining whether each EEC E(n) Rating ID 404 is valid, and subsequently, at block 410 or block 420, determining whether the corresponding FMC E(n) Rating ID 402 is valid. In a particular aspect, the FMC 110 can store a list of valid engine rating identifiers use to determine validity of the EEC E(n) Rating ID 404 and the FMC E(n) Rating ID 402.

In FIG. 4, for a particular engine E(n), if the EEC E(n) Rating ID 404 is valid and the corresponding FMC E(n) Rating ID 402 is also valid, the method 400 includes, at block 412, determining whether the FMC E(n) Rating ID 402 is equal to the EEC E(n) Rating ID 404. If the FMC E(n) Rating ID 402 is equal to the EEC E(n) Rating ID 404, the Local E(n) Rating ID 430 for the engine is set equal to the EEC E(n) Rating ID 404 for the engine, at block 414. If the FMC E(n) Rating ID 402 is not equal to the EEC E(n) Rating ID 404, a flag is set, at block 416, to indicate that the FMC E(n) Rating ID 402 for the engine has changed, and the Local E(n) Rating ID 430 for the engine is set equal to the EEC E(n) Rating ID 404 for the engine, at block 418.

In FIG. 4, for a particular engine E(n), if the EEC E(n) Rating ID 404 is valid and the corresponding FMC E(n) Rating ID 402 is not valid, the method 400 includes setting the flag, at block 416, to indicate that the FMC E(n) Rating ID 402 for the engine has changed, and setting the Local E(n) Rating ID 430 for the engine equal to the EEC E(n) Rating ID 404 for the engine, at block 418.

If the EEC E(n) Rating ID 404 for a particular engine E(n) is not valid and the corresponding FMC E(n) Rating ID 402 is valid, the method 400 includes, at block 422, setting the Local E(n) Rating ID 430 for the engine equal to the FMC E(n) Rating ID 402 for the engine. If the EEC E(n) Rating ID 404 for a particular engine E(n) is not valid and the corresponding FMC E(n) Rating ID 402 is not valid, the method 400 includes, at block 424, setting the Local E(n) Rating ID 430 for the engine to invalid.

After the Local E(n) Rating ID 430 for an engine has been determined, the method 400 includes, at block 432, mapping the Local E(n) rating ID 430 to a corresponding Local E(n) TRM ID 434. The mapping can be performed via a lookup operation using mapping data that maps engine rating identifiers to thrust model identifiers.

FIG. 5 illustrates a method 500 illustrating a particular example of operations 502 to determine a single Local TRM ID 520 that is used in in a method 600 as a comparison target. The operations 502 illustrate merely one example of operations that can be used to select the Local TRM ID 520 from among the Local E(n) TRM IDs 434.

In FIG. 5, the operations 502 include, at block 504, determining whether an engine rating changed flag is set to TRUE. For example, the engine rating changed flag can be initialized to a FALSE value, and changed to TRUE at block 416 of FIG. 4 in response to a determination that the EEC E(n) Rating ID 404 for an engine is valid and the FMC E(n) Rating ID 402 is invalid, or in response to a determination that the EEC E(n) Rating ID 404 for an engine is valid, the FMC E(n) Rating ID 402 is valid, and the FMC E(n) Rating ID 402 for the engine is not equal to the EEC E(n) Rating ID 404 for the engine.

In FIG. 5, if the engine rating change flag is set to TRUE, the method 500 includes, at block 506, selecting the Local E(n) TRM ID 434 for a default engine (engine E(1) in FIG. 5) as the Local TRM ID 520 used as the comparison target. If the engine rating change flag is not set to TRUE (e.g. is FALSE), the operations 502 include retrieving the FMC E(n) Rating ID 508 for the engine and, at block 510, determining whether the FMC E(n) Rating ID 508 is valid. If FMC E(n) Rating ID 508 is not valid, the default engine is selected as the Local TRM ID 520 used as the comparison target, at block 506. If FMC E(n) Rating ID 508 is valid, the method 500 includes, at block 512, mapping the FMC E(n) Rating ID 508 to a Local E(n) TRM ID (e.g., using the mapping data used at block 432), and using the Local E(n) TRM ID as the Local TRM ID 520 used as the comparison target.

FIG. 6 illustrates a particular example of a method 600 to determine a thrust model rating identifier that is common to all of the engines (e.g., a common TRM rating ID). The method 600 illustrates merely one example of operations that can be used to select a common TRM ID from among a set Local E(n) TRM IDs.

In FIG. 6, a placeholder variable (p) is initialized to zero at block 650, and a particular value of the index n is set (during an initial iteration) or incremented (in a subsequent iteration) at block 602. The method 600 also includes, at block 604, determining whether the Local E(n) TRM ID for the engine corresponding to the current value of index n is valid. If the Local E(n) TRM ID is not valid, the method 600 returns to block 602 and increments the index n value.

If the Local E(n) TRM ID is valid, the method 600 includes, at block 606, determining whether the Local E(n) TRM ID is equal to the Local TRM ID 520 (e.g., the comparison target previously selected). If the Local E(n) TRM ID is equal to the Local TRM ID 520, the method 600 includes, at block 608, setting the value of the placeholder variable p to the value of index n, and at block 610, determining whether all of the engines (e.g., each value of the index n) have been checked.

If all of the engines have not been checked, the method 600 returns to block 602 and increments the index n. If all of the engines have been checked, the method 600 includes, at block 612, determining whether the value of the placeholder variable p is zero. If the value of the placeholder variable p equals zero at block 612, this is an indication that no engine satisfied the conditions to reset the value of placeholder variable p from zero to the index n of the engine (e.g., at block 608). Thus, if the value of the placeholder variable p equals zero at block 612, the method 600 results in a failure indication, at block 624, in which case, the method 600 can end periodic I/O processing (e.g., at block 228).

If the value of the placeholder variable p is not equal to zero at block 612, the method 600 includes, at block 614, setting a common TRM Rating ID equal to the E(p) TRM Rating ID (where the value of the placeholder variable p is used as an index to specify an engine).

Returning to block 606, if the Local E(n) TRM ID is not equal to the Local TRM ID 520, the method 600 includes, at block 620, identifying a set of allowed proxy (AP) E(n) TRM IDs associated with the Local E(n) TRM ID for the particular engine in question. In this context, the AP E(n) TRM IDs include a superset of TRM IDs associated with the engine, of which the Local E(n) TRM ID is a subset. Other TRM IDs of the AP E(n) TRM IDs are associated with stepped down (relative to a baseline value associated with the Local E(n) TRM ID) performance conditions or stepped up performance conditions that the engine is capable of operating in, but which are not the default (e.g., optimal) performance conditions associated with the engine.

The method 600 includes, at block 622, determining whether any AP E(n) TRM ID matches the Local TRM ID 520. If one of the AP E(n) TRM IDs matches the Local TRM ID 520, the method 600 proceeds to block 610. If none of the AP E(n) TRM IDs matches the Local TRM ID 520, the method 600 includes, at block 638, a determination of whether all of the engines are associated with a Local E(n) TRM ID that is equal to the AP E(n) TRM ID. If all of the engines are associated with a Local E(n) TRM ID equal to the AP E(n) TRM ID, the method 600 includes, at block 640, setting the Local TRM ID 520 equal to the Local E(n) TRM ID, and returning to block 608. If not all of the engines are associated with a Local E(n) TRM ID equal to the AP E(n) TRM ID, the method 600 results in a failure indication, at block 642 (e.g., since at least one engine does not have a compatible TRM ID).

Returning to FIG. 2, after finishing the downselect processing, at block 232, the method 200 includes starting rating processing, at block 234. The rating processing includes operations to update the engine data 120 stored at the NVM 114, if needed, as well as various error check operations. For example, if the NVM CRC data and Engine data 120 for a particular engine were cleared, at block 306 of FIG. 3, new CRC data and engine data received from the EEC 104 for that engine 102 are stored to the NVM 114 as part of the rating processing.

Figure 7:
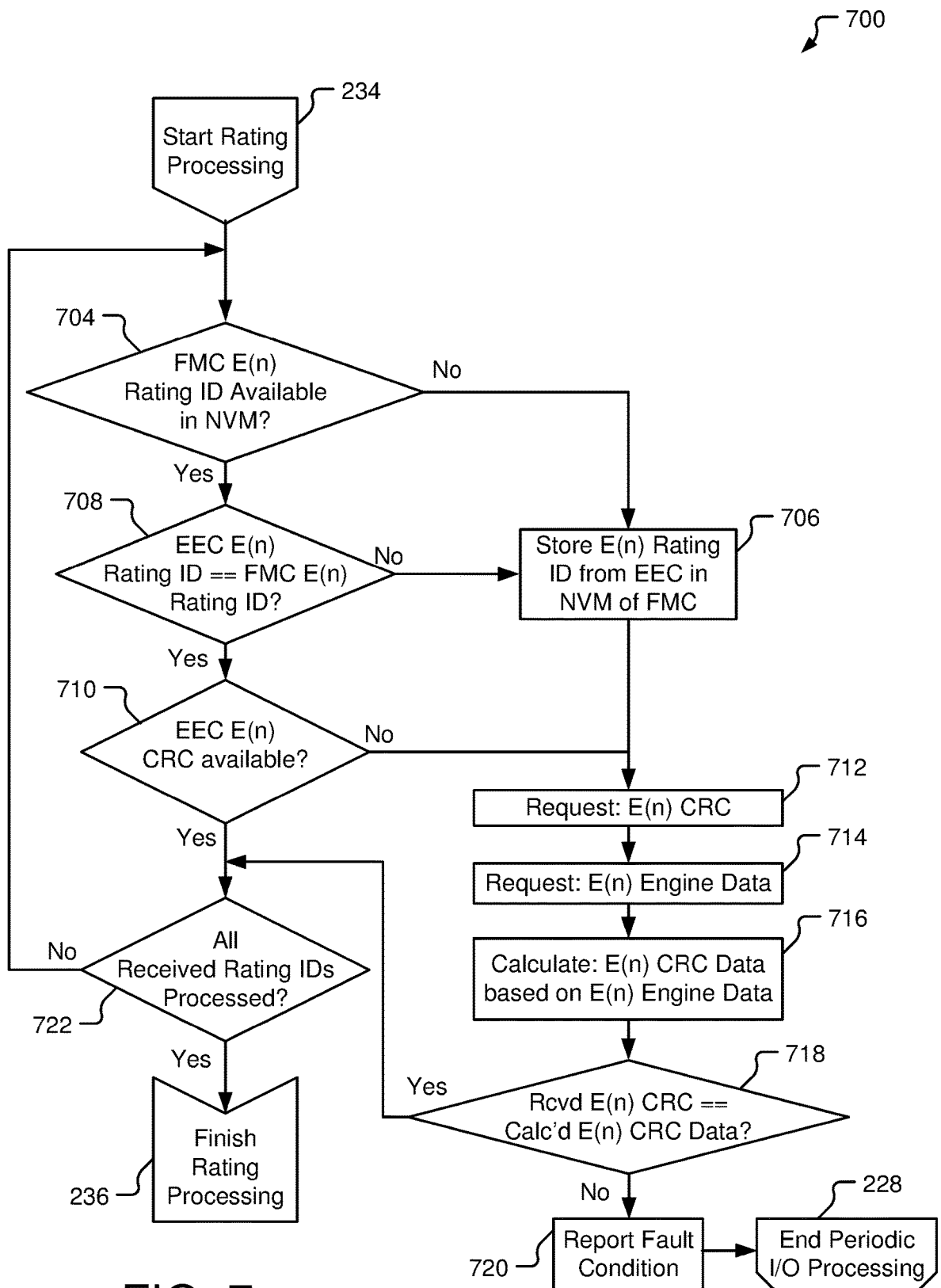
FIG. 7 is a flow chart illustrating an example of a method of rating processing that may be performed as an aspect of the method of FIG. 2.

FIG. 7 illustrates a particular example of a method 700 to perform rating processing. The method 700 illustrates merely one example of operations that can be used to process ratings. The rating processing performed by the method 700 could be performed at a different time within the method 200. For example, rating processing could be performed before downselection processing.

The method 700 includes a set of operations that are performed for each EEC E(n) Rating ID that has been received when processing occurs. The operations of the method 700 include, at block 704, determining whether an FMC E(n) Rating ID is available in the NVM 114. For example, if the particular FMC E(n) Rating ID was cleared from the NVM 114, at block 306, the FMC E(n) Rating ID will not be available when the determination is performed at block 704. If the FMC E(n) Rating ID is not available in the NVM 114, the method 700 includes, at block 706, storing the E(n) Rating ID from the EEC (i.e., the EEC E(n) Rating ID) in the NVM 114 of the FMC 110. Thus, the EEC E(n) Rating ID becomes the FMC E(n) Rating ID in this circumstance.

If the FMC E(n) Rating ID is available in the NVM 114 at block 704, the method 700 includes, at block 708, determining whether the EEC E(n) Rating ID is equal to the FMC E(n) Rating ID. If the EEC E(n) Rating ID is not equal to the FMC E(n) Rating ID, the method 700 proceeds to block 706 to store the EEC E(n) Rating ID as the FMC E(n) Rating ID. If the EEC E(n) Rating ID is equal to the FMC E(n) Rating ID, the method 700 includes, at block 710, determining whether the EEC E(n) CRC data is available.

If the EEC E(n) CRC data is not available at block 710, or if the EEC E(n) Rating ID has been stored as the FMC E(n) Rating ID at block 706, the method 700 includes, at block 712, requesting the E(n) CRC data from the EEC for the particular engine, at block 714, requesting the E(n) engine data from the EEC for the particular engine. The method 700 also includes, at block 716, calculating an E(n) CRC value based on the E(n) engine data received from the EEC, and at block 718, determining whether the received E(n) CRC data matches the E(n) CRC value calculated based on the E(n) engine data received from the EEC. If the received E(n) CRC data does not match the E(n) CRC value calculated based on the E(n) engine data received from the EEC, the method 700 includes, at block 720, reporting a fault condition, and ending periodic I/O processing, at block 228.

If the received E(n) CRC data matches the E(n) CRC value calculated based on the E(n) engine data received from the EEC, or if, at block 710, the EEC E(n) CRC data is available, the method 700 includes, at block 722, determining whether all received rating IDs have been processed. If all of the receive rating IDs have not been processed, the method 700 returns to block 704 to process other received rating IDs. If all of the receive rating IDs have been processed, the method 700 finishes the rating processing, at block 236.

Figure 8:
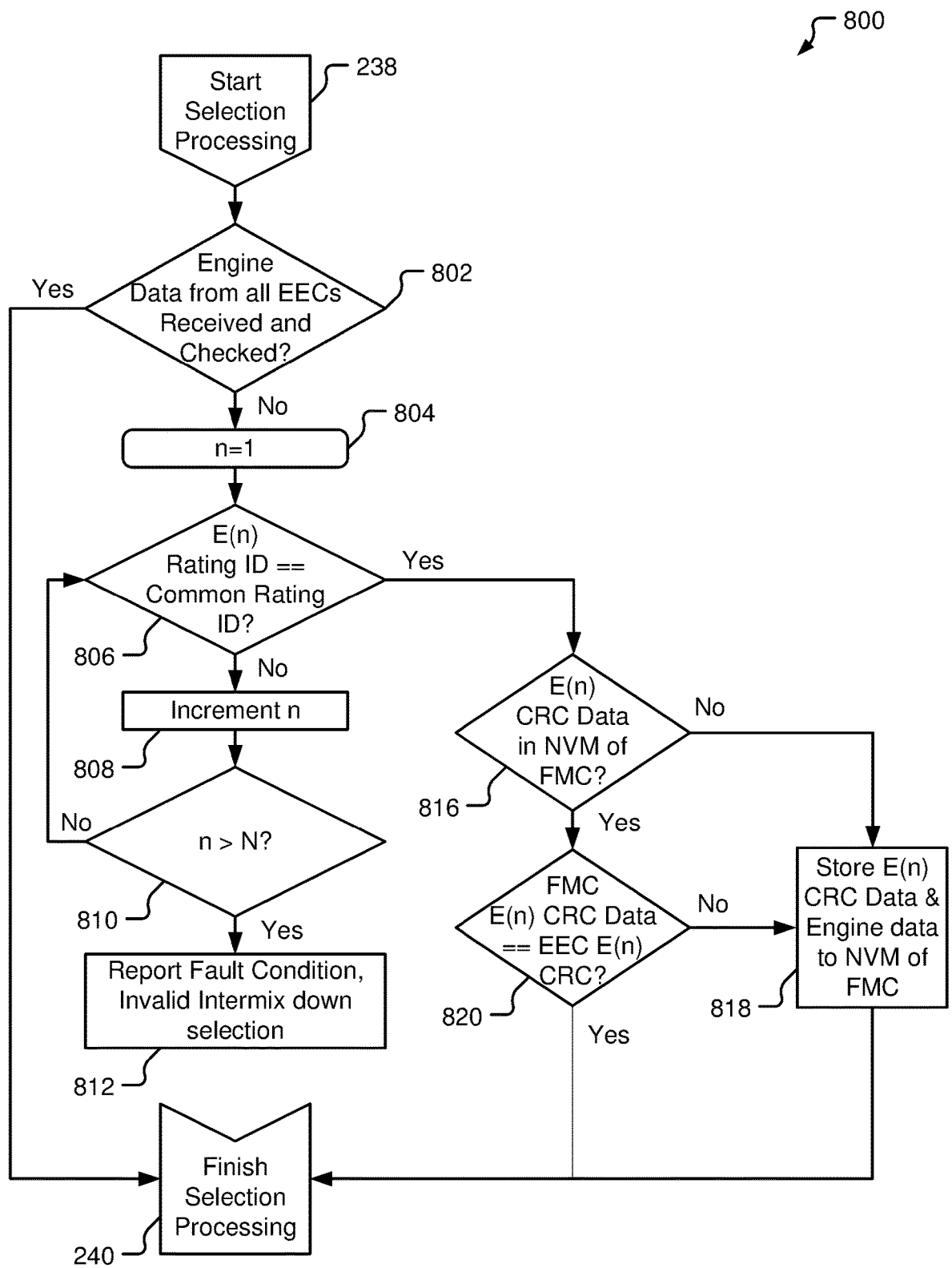
FIG. 8 is a flow chart illustrating an example of a method of selection processing that may be performed as an aspect of the method of FIG. 2.

Returning to FIG. 2, after the rating processing is finished, at block 236, the method 200 includes starting selection processing, at block 238. The selection processing includes operations to select rating information for subsequent use. FIG. 8 illustrates a particular example of a method 800 to perform selection processing. The method 800 illustrates merely one example of operations that can be used for selection processing.

The method 800 includes, at block 802, determining whether engine data from all EECs of the aircraft 100 has been received and checked. If engine data from all of the EECs of the aircraft 100 has been received and checked, the method 800 finishes the selection processing, at block 240.

If engine data from all of the EECs of the aircraft 100 has not been received and checked, the method 800 iterates through comparing engine ratings associated with the engines 102 of the aircraft 100. Iterating through the engine ratings includes, at block 804, setting the index n equal to 1. The method 800 also includes, at block 806, determining whether the E(n) Rating ID is equal to the common rating ID identified via the downselection processing. If E(n) Rating ID is not equal to the common rating ID, the method 800 includes incrementing the index n, at block 808. The method 800 further includes, at block 810, determining whether data for all of the engines has been checked (e.g., whether the value of index n exceeds the count of engines N of the aircraft 100). If data for all of the engines has been checked, the method 800 includes, at block 812, reporting a fault condition due to invalid intermix down mix selection. If data for all of the engines has not been checked, the method 800 returns to block 806.

At block 806, if the E(n) Rating ID is equal to the common rating ID identified via the downselection processing, the method 800 includes, at block 816, determining whether E(n) CRC data for engine n is stored in the NVM 114 of the FMC 110. If the E(n) CRC data are stored in the NVM 114, the method 800 includes, at block 820, determining whether the FMC E(n) CRC data matches the EEC E(n) CRC data.

If the FMC E(n) CRC data matches the EEC E(n) CRC data, or the E(n) CRC data for engine n is not stored in the NVM 114, the method 800 includes, at block 818, storing the E(n) CRC data and the engine data to the NVM 114 of the FMC 110. The method 800 finishes the selection process, at block 240, based on a determination that the FMC E(n) CRC data matches the EEC E(n) CRC data or after the E(n) CRC data and the engine data are stored at the NVM 114.

Returning to FIG. 2, after the selection processing is finished, at block 240, the method 200 returns to block 208.

Figure 9:
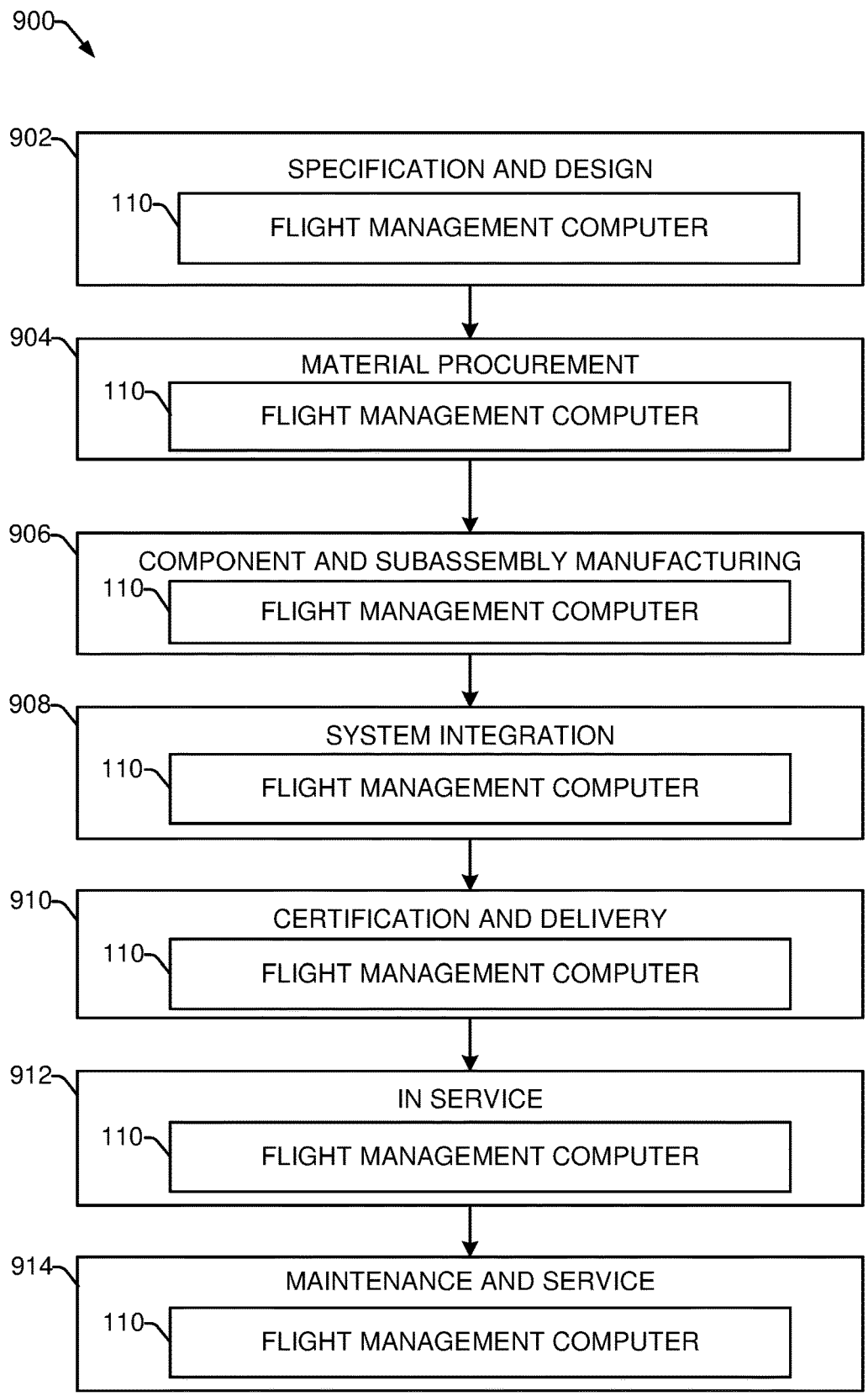
FIG. 9 is a flowchart illustrating an example of a life cycle of the aircraft of FIG. 1.

FIG. 9 is a flowchart illustrating a method 900 representing a life cycle of an aircraft that includes the FMC 110 of FIG. 1. During pre-production, the exemplary method 900 includes, at 902, specification and design of an aircraft, such as the aircraft 100 described with reference to FIG. 1. During specification and design of the aircraft, the method 900 may include specification and design of the FMC 110. At 904, the method 900 includes material procurement, which may include procuring materials for the FMC 110.

During production, the method 900 includes, at 906, component and subassembly manufacturing and, at 908, system integration of the aircraft. For example, the method 900 may include component and subassembly manufacturing of the FMC 110 and system integration of the FMC 110. At 910, the method 900 includes certification and delivery of the aircraft and, at 912, placing the aircraft in service. Certification and delivery may include certification of the FMC 110 to place the FMC 110 in service. While in service by a customer, the aircraft may be scheduled for routine maintenance and service (which may also include modification, reconfiguration, refurbishment, and so on). At 914, the method 900 includes performing maintenance and service on the aircraft, which may include performing maintenance and service on the FMC 110.

Each of the processes of the method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of the aircraft 100 of FIG. 1 is shown in FIG. 10.

Figure 10:
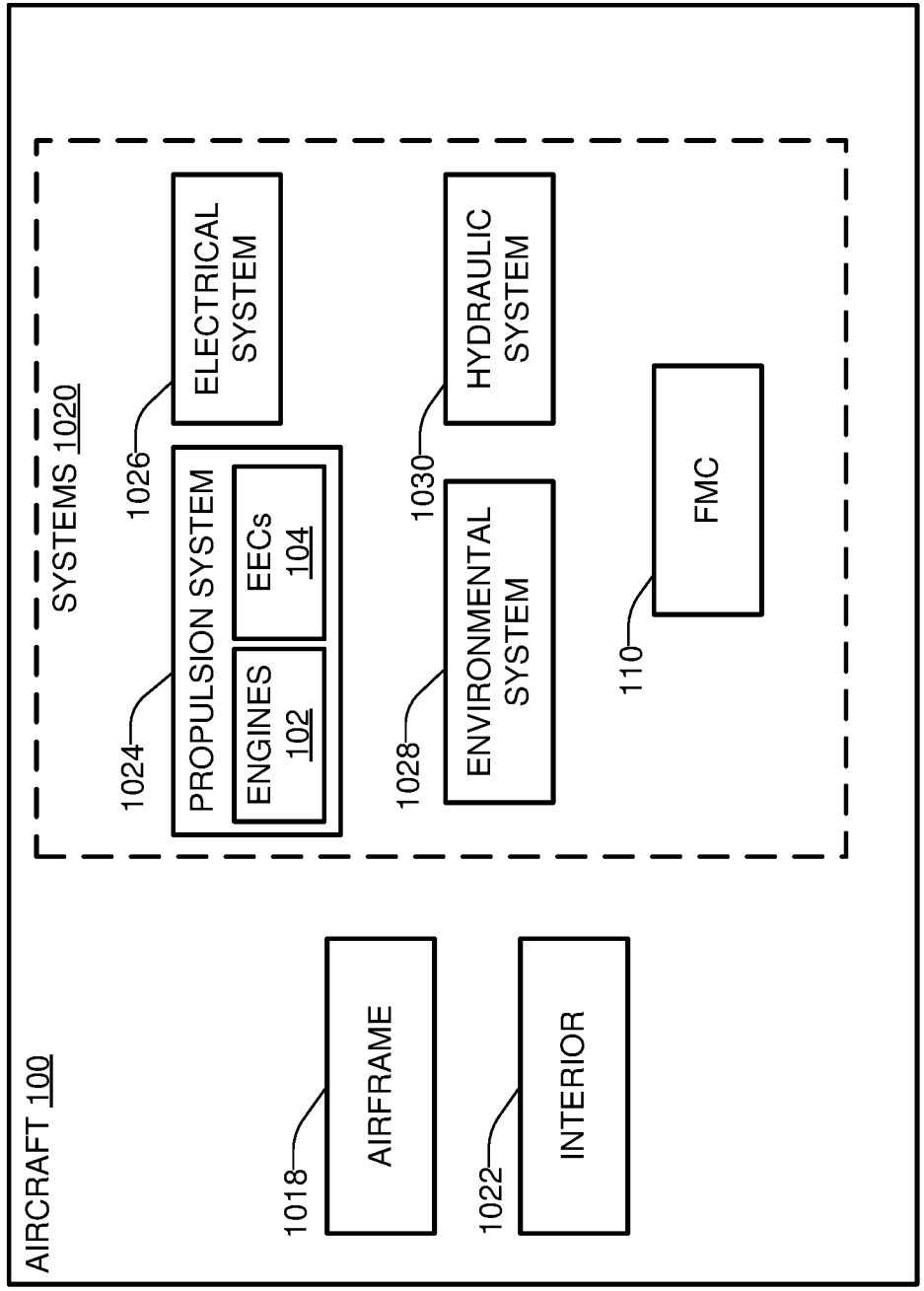
FIG. 10 is a block diagram of a particular implementation of the aircraft of FIG. 1.

In the example of FIG. 10, the aircraft 100 includes an airframe 1018 with a plurality of systems 1020 and an interior 1022. Examples of the plurality of systems 1020 include one or more of a propulsion system 1024, an electrical system 1026, an environmental system 1028, and a hydraulic system 1030. Any number of other systems may be included. In the example illustrated in FIG. 10, the propulsion system 1024 includes the engines 102 and the EECs 104. The systems 1020 in the example of FIG. 10 also include the FMC 110 of FIG. 1.

Figure 11:
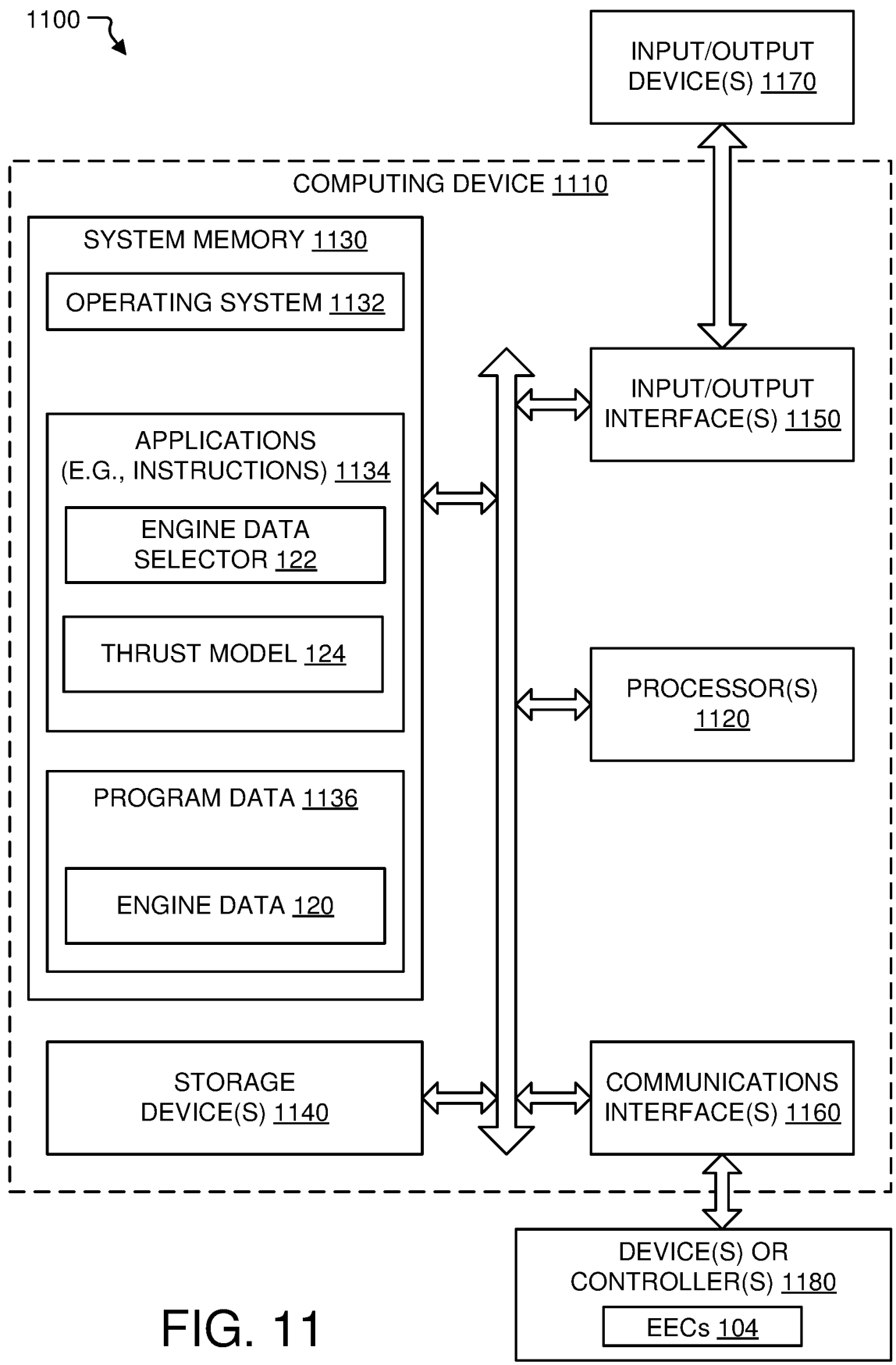
FIG. 11 is a block diagram of a computing environment including a computing device configured to support aspects of computer-implemented methods and computer-executable program instructions (or code) according to the present disclosure.

FIG. 11 is a block diagram of a computing environment 1100 including a computing device 1110 configured to support aspects of computer-implemented methods and computer-executable program instructions (or code) according to the present disclosure. For example, the computing device 1110, or portions thereof, is configured to execute instructions to initiate, perform, or control one or more operations described with reference to FIGS. 1-10.

The computing device 1110 includes one or more processors 1120. The processor(s) 1120 are configured to communicate with system memory 1130, one or more storage devices 1140, one or more input/output interfaces 1150, one or more communications interfaces 1160, or any combination thereof. The system memory 1130 includes volatile memory devices (e.g., random access memory (RAM) devices), nonvolatile memory devices (e.g., read-only memory (ROM) devices, programmable read-only memory, and flash memory), or both. The system memory 1130 stores an operating system 1132, which may include a basic input/output system for booting the computing device 1110 as well as a full operating system to enable the computing device 1110 to interact with users, other programs, and other devices. The system memory 1130 stores system (program) data 1136, such as the engine data 120.

The system memory 1130 includes one or more applications 1134 (e.g., sets of instructions) executable by the processor(s) 1120. As an example, the one or more applications 1134 include instructions executable by the processor(s) 1120 to initiate, control, or perform one or more operations described with reference to FIGS. 1-10. To illustrate, the one or more applications 1134 include instructions executable by the processor(s) 1120 to initiate, control, or perform one or more operations described with reference to the engine data selector 122, the thrust model 124, or a combination thereof.

The one or more storage devices 1140 include nonvolatile storage devices, such as magnetic disks, optical disks, or flash memory devices. In a particular example, the storage devices 1140 include both removable and non-removable memory devices. The storage devices 1140 are configured to store an operating system, images of operating systems, applications (e.g., one or more of the applications 1134), and program data (e.g., the program data 1136). In a particular aspect, the system memory 1130, the storage devices 1140, or both, include tangible computer-readable media. In a particular aspect, one or more of the storage devices 1140 are external to the computing device 1110.

The one or more input/output interfaces 1150 enable the computing device 1110 to communicate with one or more input/output devices 1170 to facilitate user interaction. For example, the one or more input/output interfaces 1150 can include a display interface, an input interface, or both. For example, the input/output interface 1150 is adapted to receive input from a user, to receive input from another computing device, or a combination thereof. In some implementations, the input/output interface 1150 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1170 includes one or more user interface devices and displays, including some combination of buttons, keyboards, pointing devices, displays, speakers, microphones, touch screens, and other devices.

The processor(s) 1120 are configured to communicate with devices or controllers 1180 via the one or more communications interfaces 1160. For example, the one or more communications interfaces 1160 can include a network interface. The devices or controllers 1180 can include, for example, the EECs 104, one or more other devices, or any combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-11. In some implementations, part or all of one or more of the operations or methods of FIGS. 1-11 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, a method includes accessing, by one or more processors of a flight management computer (FMC) of an aircraft, first engine data from a non-volatile memory of the FMC; and performing, by the one or more processors, one or more error check operations based on at least the first engine data to determine whether to select an engine thrust rating for a thrust model of the aircraft based, in part, on a first engine rating identifier associated with the first engine data.

Example 2 includes the method of Example 1, wherein the one or more error check operations include computing a cyclic redundancy check (CRC) value based on the first engine data and comparing the computed CRC value to a CRC value from the non-volatile memory of the FMC.

Example 3 includes the method of Example 1 or Example 2, wherein the one or more error check operations include comparing a CRC value received from an electronic engine controller (EEC) and a corresponding CRC value from the non-volatile memory of the FMC.

Example 4 includes the method of Example 3 and further includes, based on a result of the one or more error check operations, clearing the first engine data from the non-volatile memory of the FMC.

Example 5 includes the method of any of Examples 1 to 4 and further includes receiving, at the one or more processors of the FMC from a first EEC of the aircraft, a first thrust rating identifier associated with a first engine of the aircraft; receiving, at the one or more processors of the FMC from a second EEC of the aircraft, a second thrust rating identifier associated with a second engine of the aircraft; and determining a single rating identifier based on the first thrust rating identifier, the second thrust rating identifier, and the first engine rating identifier.

Example 6 includes the method of Example 5, wherein said determining the single rating identifier comprises: determining, for the first engine, a first local engine rating identifier based on the first thrust rating identifier and the first engine rating identifier; mapping the first local engine rating identifier to a first local thrust rating model (TRM) identifier; determining, for the second engine, a second local engine rating identifier based on the second thrust rating identifier and a second engine rating identifier from the non-volatile memory of the FMC; mapping the second local engine rating identifier to a second local TRM identifier; designating a single local TRM identifier as a comparison target; and comparing the first local engine rating identifier, the second local engine rating identifier, or both, to the comparison target to identify a common rating identifier as the single rating identifier.

Example 7 includes the method of any of Examples 1 to 6 and further includes, after powerup of the FMC, receiving sensor data, wherein the first engine data is accessed responsive to the sensor data indicating that the aircraft is on the ground.

Example 8 includes the method of Example 7 and further includes, after selecting the engine thrust rating for the thrust model of the aircraft, performing one or more inflight calculations based on the engine thrust rating.

Example 9 includes the method of any of Examples 1 to 8 and further includes accessing, from the non-volatile memory of the FMC, additional engine data for each engine of one or more additional engines of the aircraft; and performing, by the one or more processors, one or more additional error check operations based on the additional engine data to determine whether to select the engine thrust rating for the thrust model of the aircraft based, in part, on one or more engine rating identifiers associated with the additional engine data.

According to Example 10, a device (such as a line replaceable unit (LRU)) includes: a memory configured to store instructions; and a processor configured to execute the instructions to perform the method of any of Examples 1 to 9.

According to Example 11, a non-transitory computer-readable medium stores instructions that, when executed by a processor, cause the processor to perform the method of any of Examples 1 to 9.

According to Example 12, an apparatus includes means for implementing the method of any of Examples 1 to 9.

According to Example 13, an aircraft includes two or more engines; two or more EECs, each EEC associated with a respective one of the two or more engines; and an FMC communicatively coupled to the two or more EECs, wherein the FMC includes a non-volatile memory and one or more processors configured to access first engine data from the non-volatile memory; and perform one or more error check operations based on at least the first engine data to determine whether to select an engine thrust rating for a thrust model of the aircraft based, in part, on a first engine rating identifier associated with the first engine data.

Example 14 includes the aircraft of Example 13, wherein the one or more error check operations include computing a CRC value based on the first engine data and comparing the computed CRC value to a CRC value from the non-volatile memory of the FMC.

Example 15 includes the aircraft of Example 13 or Example 14, wherein the one or more error check operations include comparing a CRC value received from an EEC and a corresponding CRC value from the non-volatile memory of the FMC.

Example 16 includes the aircraft of Example 15, wherein the one or more processors are further configured to, based on a result of the one or more error check operations, clear the first engine data from the non-volatile memory of the FMC.

Example 17 includes the aircraft of any of Examples 13 to 16, wherein the one or more processors are further configured to receive, from a first EEC of the two or more EECs, a first thrust rating identifier associated with a first engine of the aircraft; receive, from a second EEC of the two or more EECs, a second thrust rating identifier associated with a second engine of the aircraft; and determine a single rating identifier based on the first thrust rating identifier, the second thrust rating identifier, and the first engine rating identifier.

Example 18 includes the aircraft of Example 17, wherein, to determine the single rating identifier, the one or more processors are configured to determine, for the first engine, a first local engine rating identifier based on the first thrust rating identifier and the first engine rating identifier; map the first local engine rating identifier to a first local TRM identifier; determine, for the second engine, a second local engine rating identifier based on the second thrust rating identifier and a second engine rating identifier from the non-volatile memory of the FMC; map the second local engine rating identifier to a second local TRM identifier; designate a single local TRM identifier as a comparison target; and compare the first local engine rating identifier, the second local engine rating identifier, or both, to the comparison target to identify a common rating identifier as the single rating identifier.

Example 19 includes the aircraft of any of Examples 13 to 18 and further includes one or more sensors configured to generate sensor data indicating whether the aircraft is on the ground, wherein the one or more processors are configured to access engine data from the non-volatile memory and select the engine thrust rating for the thrust model based on the sensor data indicating that the aircraft is on the ground.

Example 20 includes the aircraft of Example 19, wherein the one or more processors are further configured to, after selecting the engine thrust rating for the thrust model of the aircraft, perform one or more inflight calculations based on the engine thrust rating.

Example 21 includes the aircraft of any of Examples 13 to 20, wherein the one or more processors are further configured to access, from the non-volatile memory, additional engine data for each additional engine of the two or more engines; and perform one or more additional error check operations based on the additional engine data to determine whether to select the engine thrust rating for the thrust model of the aircraft based, in part, on one or more engine rating identifiers associated with the additional engine data.

According to Example 22, a non-transitory computer-readable medium stores instructions that are executable by one or more processors to cause the one or more processors to access, from a non-volatile memory of an FMC, engine data associated with engines of an aircraft; perform one or more error check operations based on at least the engine data accessed from the non-volatile memory; and select an engine thrust rating for a thrust model of the aircraft, wherein the engine thrust rating is selected from among the engine data accessed from the non-volatile memory or from engine data received from an EEC of the aircraft based, at least in part, on results of the one or more error check operations.

Example 23 includes the non-transitory computer-readable medium of Example 22, wherein the instructions are executable by one or more processors to cause the one or more processors to determine, for a first engine of the aircraft, a first local engine rating identifier based on the engine data from the FMC and a first thrust rating identifier received from a first EEC associated with the first engine; map the first local engine rating identifier to a first local TRM identifier; determine, for a second engine of the aircraft, a second local engine rating identifier based on the engine data from the FMC and a second thrust rating identifier received from a second EEC associated with the second engine; map the second local engine rating identifier to a second local TRM identifier; designate a single local TRM identifier as a comparison target; perform a comparison of the first local engine rating identifier, the second local engine rating identifier, or both, to the comparison target; and determine a single rating identifier based on the comparison.

According to Example 24, a method includes between powerup of an FMC of an aircraft and a subsequent takeoff of the aircraft: determining, by one or more processors of the FMC, a plurality of local TRM identifiers, including at least one local TRM identifier for each respective one of a plurality of engines of the aircraft; and selecting, by the one or more processors of the FMC based on the plurality of local TRM identifiers, intermix thrust model data for use by the FMC during a flight of the aircraft, wherein the intermix thrust model data is associated with a thrust model identifier that is common to the plurality of engines.

Example 25 includes the method of Example 24, wherein said determining the plurality of local TRM identifiers comprises: accessing, from a non-volatile memory of the FMC, an FMC engine rating for a particular engine of the plurality of engines; obtaining, from an EEC associated with the particular engine, an EEC engine rating for the particular engine; and determining a local rating identifier for the particular engine based on a selected one of the FMC engine rating for the particular engine or the EEC engine rating for the particular engine.

Example 26 includes the method of Example 25, wherein said determining the plurality of local TRM identifiers comprises determining a local TRM identifier for the particular engine based on the local rating identifier for the particular engine and mapping data that maps rating identifiers to TRM identifiers.

Example 27 includes the method of Example 25 or Example 26, wherein said determining the plurality of local TRM identifiers comprises selecting the EEC engine rating for the particular engine as the local rating identifier based on a determination that the EEC engine rating is valid.

Example 28 includes the method of any of Examples 25 to 27, wherein said determining the plurality of local TRM identifiers comprises selecting the FMC engine rating for the particular engine as the local rating identifier based on a determination that the EEC engine rating is not valid and that the FMC engine rating is valid.

Example 29 includes the method of any of Examples 25 to 28 and further includes setting a flag indicating detection of an engine data change for a particular engine based on a determination that an EEC engine rating for the particular engine is valid and an FMC engine rating for the particular engine is not valid.

Example 30 includes the method of any of Examples 24 to 29, wherein said selecting the intermix thrust model data comprises determining a common rating identifier based on the plurality of local TRM identifiers.

Example 31 includes the method of Example 30, wherein said determining the common rating identifier comprises: selecting a representative local TRM identifier from among the plurality of local TRM identifiers; and comparing each of the plurality of local TRM identifiers to the representative local TRM identifier.

Example 32 includes the method of Example 31, wherein the representative local TRM identifier is designated as the common rating identifier based on a determination that each of the plurality of local TRM identifiers matches the representative local TRM identifier.

According to Example 33, a device (such as an LRU) includes: a memory configured to store instructions; and a processor configured to execute the instructions to perform the method of any of Examples 24 to 32.

According to Example 34, a non-transitory computer-readable medium stores instructions that, when executed by a processor, cause the processor to perform the method of any of Examples 24 to Example 32.

According to Example 35, an apparatus includes means for implementing the method of any of Examples 24 to Example 32.

According to Example 36, an aircraft includes two or more engines; two or more EECs, wherein each EEC is associated with a respective one of the two or more engines; and an FMC communicatively coupled to the two or more EECs, wherein the FMC includes one or more processors configured to, between powerup of the FMC and a subsequent takeoff of the aircraft: determine a plurality of local TRM identifiers, including at least one local TRM identifier for each respective one of the two or more engines; and select, based on the plurality of local TRM identifiers, intermix thrust model data for use by the FMC during a flight of the aircraft, wherein the intermix thrust model data is associated with a thrust model identifier that is common to the two or more engines.

Example 37 includes the aircraft of Example 36, wherein, to determine the plurality of local TRM identifiers, the one or more processors are configured to access, from a non-volatile memory of the FMC, a first FMC engine rating for a first engine of the two or more engines; obtain, from a first EEC associated with the first engine, a first EEC engine rating for the first engine; and determine a first local rating identifier for the first engine based on a selected one of the first FMC engine rating or the first EEC engine rating.

Example 38 includes the aircraft of Example 36 or Example 37, wherein the one or more processors are configured to determine a first local TRM identifier of the plurality of local TRM identifiers based on the first local rating identifier and mapping data that maps rating identifiers to TRM identifiers.

Example 39 includes the aircraft of Example 38, wherein, to determine the first local TRM identifier, the one or more processors are configured to select the first EEC engine rating as the first local rating identifier based on a determination that the first EEC engine rating is valid.

Example 40 includes the aircraft of Example 38 or Example 39, wherein, to determine the first local TRM identifier, the one or more processors are configured to select the first FMC engine rating as the first local rating identifier based on a determination that the first EEC engine rating is not valid and that the first FMC engine rating is valid.

Example 41 includes the aircraft of any of Examples 37 to 40, wherein the one or more processors are further configured to set a flag indicating detection of an engine data change for a particular engine based on a determination that an EEC engine rating for the particular engine is valid and an FMC engine rating for the particular engine is not valid.

Example 42 includes the aircraft of any of Examples 36 to 41, wherein, to select the intermix thrust model data, the one or more processors are configured to determine a common rating identifier based on the plurality of local TRM identifiers.

Example 43 includes the aircraft of Example 42, wherein, to determine the common rating identifier, the one or more processors are configured to select a representative local TRM identifier from among the plurality of local TRM identifiers; and compare each of the plurality of local TRM identifiers to the representative local TRM identifier.

Example 44 includes the aircraft of Example 43, wherein the one or more processors are configured to designate the representative local TRM identifier as the common rating identifier based on a determination that each of the plurality of local TRM identifiers matches the representative local TRM identifier.

According to Example 45, a non-transitory computer-readable medium stores instructions that are executable by one or more processors to cause the one or more processors to, between powerup of an FMC of an aircraft and a subsequent takeoff of the aircraft: determine a plurality of local TRM identifiers, including at least one local TRM identifier for each respective one of a plurality of engines of the aircraft; and select, based on the plurality of local TRM identifiers, intermix thrust model data for use by the FMC during a flight of the aircraft, wherein the intermix thrust model data is associated with a thrust model identifier that is common to the plurality of engines.

Example 46 includes the non-transitory computer-readable medium of Example 45, wherein, to determine the plurality of local TRM identifiers, the one or more processors are configured to access, from a non-volatile memory of the FMC, a first FMC engine rating for a first engine of the plurality of engines; obtain, from a first EEC associated with the first engine, a first EEC engine rating for the first engine; and determine a first local rating identifier for the first engine based on a selected one of the first FMC engine rating or the first EEC engine rating.

Example 47 includes the non-transitory computer-readable medium of Example 45 or Example 46, wherein the one or more processors are configured to determine a first local TRM identifier of the plurality of local TRM identifiers based on the first local rating identifier and mapping data that maps rating identifiers to TRM identifiers.

Example 48 includes the non-transitory computer-readable medium of Example 47, wherein, to determine the first local TRM identifier, the one or more processors are configured to select the first EEC engine rating as the first local rating identifier based on a determination that the first EEC engine rating is valid.

Example 49 includes the non-transitory computer-readable medium of Example 47 or Example 48, wherein, to determine the first local TRM identifier, the one or more processors are configured to select the first FMC engine rating as the first local rating identifier based on a determination that the first EEC engine rating is not valid and that the first FMC engine rating is valid.

Example 50 includes the non-transitory computer-readable medium of any of Examples 46 to 49, wherein the one or more processors are further configured to set a flag indicating detection of an engine data change based on a determination that an EEC engine rating for the particular engine is valid and an FMC engine rating for the particular engine is not valid.

Example 51 includes the non-transitory computer-readable medium of any of Examples 45 to 50, wherein, to select the intermix thrust model data, the one or more processors are configured to determine a common rating identifier based on the plurality of local TRM identifiers.

Example 52 includes the non-transitory computer-readable medium of Example 51, wherein, to determine the common rating identifier, the one or more processors are configured to select a representative local TRM identifier from among the plurality of local TRM identifiers; and compare each of the plurality of local TRM identifiers to the representative local TRM identifier.

Example 53 includes the non-transitory computer-readable medium of Example 52, wherein the one or more processors are configured to designate the representative local TRM identifier as the common rating identifier based on a determination that each of the plurality of local TRM identifiers matches the representative local TRM identifier.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
   between powerup of a flight management computer (FMC) of an aircraft and a subsequent takeoff of the aircraft:
      determining, by one or more processors of the FMC, a plurality of local thrust rating model (TRM) identifiers, the plurality of local TRM identifiers including at least one local TRM identifier for each respective one of a plurality of engines of the aircraft, wherein the at least one local TRM identifier for a particular engine of the plurality of engines is determined based on mapping data operable to map a local engine rating identifier associated with the particular engine to a local TRM identifier associated with the particular engine, wherein determining the plurality of local TRM identifiers includes performing a mapping operation to map the local engine rating identifier associated with the particular engine to the local TRM identifier associated with the particular engine, wherein the mapping operation includes a lookup operation performed on the mapping data; and
      selecting, by the one or more processors of the FMC based on the plurality of local TRM identifiers, intermix thrust model data for use by the FMC during a flight of the aircraft, wherein the intermix thrust model data is associated with a thrust model identifier that is common to the plurality of engines; and
   during and subsequent to takeoff of the aircraft, operating the plurality of engines based on an intermix thrust model operable to perform inflight calculations based on the thrust model identifier that is common to the plurality of engines.

2. The method of claim 1, wherein said determining the plurality of local TRM identifiers comprises:
   accessing, from a non-volatile memory of the FMC, an FMC engine rating identifier for the particular engine of the plurality of engines;
   obtaining, from an electronic engine controller (EEC) associated with the particular engine, an EEC engine rating identifier for the particular engine; and
   selecting the local engine rating identifier for the particular engine from either one of the FMC engine rating identifier for the particular engine or the EEC engine rating identifier for the particular engine.

3. The method of claim 2, wherein said determining the plurality of local TRM identifiers comprises selecting the EEC engine rating identifier for the particular engine as the local engine rating identifier based on a determination that the FMC engine rating identifier is invalid, wherein determining the FMC engine rating identifier is invalid comprises:
   receiving data from the particular engine;
   determining an error check value based on the data;
   comparing the determined error check value to an error check value stored in the FMC and that is associated with the particular engine; and
   indicating that the FMC engine rating identifier is invalid in response to the determined error check value failing to match the stored error check value.

4. The method of claim 2, wherein said determining the plurality of local TRM identifiers comprises selecting the FMC engine rating identifier for the particular engine as the local engine rating identifier based on a determination that the EEC engine rating identifier is not valid and that the FMC engine rating identifier is valid, the method further comprising determining that the FMC engine rating identifier is valid, wherein determining that the FMC engine rating identifier is valid comprises:
   receiving data from the particular engine;
   determining an error check value based on the data;
   comparing the determined error check value to an error check value stored in the FMC and that is associated with the particular engine; and
   indicating that the FMC engine rating identifier is valid in response to the determined error check value matching the stored error check value.

5. The method of claim 3, further comprising setting a flag indicating detection of an engine data change for the particular engine based on a determination that the FMC engine rating identifier is invalid.

6. The method of claim 1, wherein said selecting the intermix thrust model data comprises determining a common rating identifier based on the plurality of local TRM identifiers, the common rating identifier corresponding to the thrust model identifier that is common to the plurality of engines, wherein said determining the common rating identifier comprises:
   selecting a representative local TRM identifier from among the plurality of local TRM identifiers; and
   comparing each of the plurality of local TRM identifiers to the representative local TRM identifier, the representative local TRM identifier designated as the common rating identifier based on a determination that each of the plurality of local TRM identifiers matches the representative local TRM identifier.

7. An aircraft comprising:
   two or more engines;
   two or more electronic engine controllers (EECs), wherein each EEC is associated with a respective one of the two or more engines; and a flight management computer (FMC) communicatively coupled to the two or more EECs, wherein the FMC includes one or more processors configured to:
  between powerup of the FMC and a subsequent takeoff of the aircraft:
    determine a plurality of local thrust rating model (TRM) identifiers, the plurality of local TRM identifiers including at least one local TRM identifier for each respective one of the two or more engines, wherein a first local TRM identifier for a first engine of the two or more engines is determined based on mapping data operable to map a first local engine rating identifier associated with the first engine to the first local TRM identifier associated with the first engine, wherein, to determine the plurality of local TRM identifiers, the one or more processors are configured to perform a mapping operation to map the first local engine rating identifier associated with the first engine to the local TRM identifier associated with the first engine, the mapping operation including a lookup operation performed on the mapping data; and
    select, based on the plurality of local TRM identifiers, intermix thrust model data for use by the FMC during a flight of the aircraft, wherein the intermix thrust model data is associated with a thrust model identifier that is common to the two or more engines; and
  during and subsequent to takeoff of the aircraft, operating the two or more engines based on an intermix thrust model operable to perform inflight calculations based on the thrust model identifier that is common to the two or more engines.

8. The aircraft of claim 7, wherein, to determine the plurality of local TRM identifiers, the one or more processors are configured to:
  access, from a non-volatile memory of the FMC, a first FMC engine rating identifier for the first engine of the two or more engines;
  obtain, from a first EEC associated with the first engine, a first EEC engine rating identifier for the first engine; and
  select the first local engine rating identifier for the first engine from either one of the first FMC engine rating identifier or the first EEC engine rating identifier.

9. The aircraft of claim 8, wherein, to determine the first local TRM identifier, the one or more processors are configured to select the first EEC engine rating identifier as the first local engine rating identifier based on a determination that the first FMC engine rating identifier is invalid, wherein, to determine that the first FMC engine rating identifier is invalid, the one or more processors are configured to:
  receive data from the first engine;
  determine an error check value based on the data;
  compare the determined error check value to an error check value stored in the FMC and that is associated with the first engine; and
  indicate that the first FMC engine rating identifier is invalid in response to the determined error check value failing to match the stored error check value.

10. The aircraft of claim 8, wherein, to determine the first local TRM identifier, the one or more processors are configured to select the first FMC engine rating identifier as the first local engine rating identifier based on a determination that the first EEC engine rating identifier is not valid and that the first FMC engine rating identifier is valid, wherein the one or more processors are further configured to determine that the FMC engine rating identifier is valid, wherein, to determine that the FMC engine rating identifier is valid, the one or more processors are configured to:
  receive data from the first engine;
  determine an error check value based on the data;
  compare the determined error check value to an error check value stored in the FMC and that is associated with the first engine; and
  indicate that the first FMC engine rating identifier is valid in response to the determined error check value matching the stored error check value.

11. The aircraft of claim 9, wherein the one or more processors are further configured to set a flag indicating detection of an engine data change for the first engine based on a determination that an EEC engine rating identifier for the first engine is valid and an FMC engine rating identifier for the first engine is invalid.

12. The aircraft of claim 7, wherein, to select the intermix thrust model data, the one or more processors are configured to determine a common rating identifier based on the plurality of local TRM identifiers, wherein the common rating identifier corresponds to the thrust model identifier that is common to the two or more engines.

13. The aircraft of claim 12, wherein:
  to determine the common rating identifier, the one or more processors are configured to:
    select a representative local TRM identifier from among the plurality of local TRM identifiers; and
    compare each of the plurality of local TRM identifiers to the representative local TRM identifier; and
  the one or more processors are further configured to designate the representative local TRM identifier as the common rating identifier based on a determination that each of the plurality of local TRM identifiers matches the representative local TRM identifier.

14. A non-transitory computer-readable medium storing instructions that are executable by one or more processors to cause the one or more processors to:
  between powerup of a flight management computer (FMC) of an aircraft and a subsequent takeoff of the aircraft:
    determine a plurality of local thrust rating model (TRM) identifiers, the plurality of local TRM identifiers including at least one local TRM identifier for each respective one of a plurality of engines of the aircraft, wherein the at least one local TRM identifier for a particular engine of the plurality of engines is determined based on mapping data operable to map a local engine rating identifier associated with the particular engine to a local TRM identifier associated with the particular engine, wherein, to determine the plurality of local TRM identifiers, the instructions, when executed by the one or more processors, cause the one or more processors to perform a mapping operation to map the local engine rating identifier associated with the particular engine to the local TRM identifier associated with the particular engine, the mapping operation including a lookup operation performed on the mapping data; and
    select, based on the plurality of local TRM identifiers, intermix thrust model data for use by the FMC during a flight of the aircraft, wherein the intermix thrust model data is associated with a thrust model identifier that is common to the plurality of engines; and
  during and subsequent to takeoff of the aircraft, operate the plurality of engines based on an intermix thrust model operable to perform inflight calculations based on the thrust model identifier that is common to the plurality of engines.

15. The non-transitory computer-readable medium of claim 14, wherein, to determine the plurality of local TRM identifiers, the instructions, when executed by the one or more processors, cause the one or more processors to:
  access, from a non-volatile memory of the FMC, a first FMC engine rating identifier for the particular engine of the plurality of engines;
  obtain, from a first EEC associated with the particular engine, a first EEC engine rating identifier for the particular engine; and
  select the local engine rating identifier for the particular engine from either one of the first FMC engine rating identifier or the first EEC engine rating identifier.

16. The method of claim 1, further comprising:
  selecting the local engine rating identifier for the particular engine from either one of an FMC engine rating identifier for the particular engine or an EEC engine rating identifier for the particular engine, wherein selecting the local engine rating identifier comprises performing an error check operation on engine data received from the particular engine to select the FMC engine rating or the EEC engine rating for the particular engine.

17. The method of claim 1, wherein determining the local TRM identifier for a particular engine of the plurality of engines includes, for the particular engine:
  performing an error check operation on an electronic engine controller (EEC) rating identifier of the particular engine and on an FMC rating identifier of the particular engine, the EEC rating identifier associated with first data from an EEC of the particular engine, and the FMC rating identifier associated with second data stored in a non-volatile memory of the FMC;
  in response to the EEC rating identifier being invalid and the FMC rating identifier being valid based on the error check operation, identifying the FMC rating identifier as the local engine rating identifier; and
  mapping the local engine rating identifier to the local TRM identifier based on mapping data.

18. The aircraft of claim 7, wherein, to determine the local TRM identifier for a particular engine of the two or more engines, for the particular engine, the one or more processors are configured to:
  perform an error check operation on an electronic engine controller (EEC) rating identifier of the particular engine and on an FMC rating identifier of the particular engine, the EEC rating identifier associated with first data from an EEC of the particular engine, and the FMC rating identifier associated with second data stored in a non-volatile memory of the FMC;
  in response to the EEC rating identifier being invalid and the FMC rating identifier being valid based on the error check operation, identify the FMC rating identifier as the first local engine rating identifier; and
  map the first local engine rating identifier to the local TRM identifier based on the mapping data.

19. The non-transitory computer-readable medium of claim 14, wherein, to determine the local TRM identifier for a particular engine of the plurality of engines, the instructions, when executed by the one or more processors, cause, for the particular engine, the one or more processors to:
  perform an error check operation on an electronic engine controller (EEC) rating identifier of the particular engine and on an FMC rating identifier of the particular engine, the EEC rating identifier associated with first data from an EEC of the particular engine, and the FMC rating identifier associated with second data stored in a non-volatile memory of the FMC;
  in response to the EEC rating identifier being invalid and the FMC rating identifier being valid based on the error check operation, identify the FMC rating identifier as the local engine rating identifier; and
  map the local engine rating identifier to the local TRM identifier based on the mapping data.

20. The non-transitory computer-readable medium of claim 14, wherein the instructions, when executed by the one or more processors, further cause the one or more processors to select the local engine rating identifier for the particular engine from either one of an FMC engine rating identifier for the particular engine or an EEC engine rating identifier for the particular engine, wherein selection of the local engine rating identifier comprises performance of an error check operation on engine data received from the particular engine to select the FMC engine rating or the EEC engine rating for the particular engine.

* * * * *